United States Patent [19]

Atkinson et al.

[11] Patent Number: 5,732,257
[45] Date of Patent: Mar. 24, 1998

[54] OBJECT CONVERSION METHOD FROM A FLAT OBJECT SPACE TO A CLASS STRUCTURED SPACE

[75] Inventors: Toni Atkinson; Steve J. Constant, both of Ft. Collins, Colo.

[73] Assignee: Hewlett-Packard Co., Palo Alto, Calif.

[21] Appl. No.: 527,644

[22] Filed: Sep. 13, 1995

[51] Int. Cl.⁶ .................................................. G06F 17/30
[52] U.S. Cl. ........................ 395/604; 395/613; 395/614; 395/682; 395/683; 395/707
[58] Field of Search .......................... 395/604, 613, 395/614, 682, 683, 707

[56] References Cited

U.S. PATENT DOCUMENTS

| 4,930,071 | 5/1990 | Tou et al. | 364/300 |
|---|---|---|---|
| 5,261,080 | 11/1993 | Khoyi et al. | 395/500 |
| 5,263,167 | 11/1993 | Conner et al. | 395/700 |
| 5,291,583 | 3/1994 | Bapat | 395/600 |
| 5,295,256 | 3/1994 | Bapat | 395/600 |
| 5,297,279 | 3/1994 | Bannon et al. | 395/600 |
| 5,377,350 | 12/1994 | Skinner | 395/600 |
| 5,421,015 | 5/1995 | Khoyi et al. | 395/650 |
| 5,437,027 | 7/1995 | Bannon et al. | 395/600 |
| 5,499,371 | 3/1996 | Henninger et al. | 395/700 |
| 5,548,749 | 8/1996 | Kroenke et al. | 395/600 |
| 5,615,362 | 3/1997 | Jensen et al. | 395/614 |

*Primary Examiner*—Thomas G. Black
*Assistant Examiner*—Jean M. Corrielus

[57] ABSTRACT

An object conversion system which allows applications and their data to migrate from a classless object space to a class-based object space independently of other applications and data. A set of procedures operate upon, update, and maintain a set of four tables, including, (1) a field location table for use in determining whether a field was created by a classless object model application or a class-based object model application; (2) a field method table for storing mappings from fields to both their corresponding class and method for access; (3) an identification table for storing the mapping between a classless object ID and its corresponding class-based object ID; and (4) an object description table for storing the mapping between a classless object ID to every field associated with that classless object ID. The procedures which operate upon these tables include (1) field creation means for creating a field; (2) field retrieval means for retrieving the value of a field; (3) field setting means for setting the value of a field; (4) object field retrieval means for retrieving the values of every field for a given classless object ID; (5) proxy object creation means for creating a classless object ID for a newly-created local class-based object; (6) proxy object deletion means for removing the classless object ID for a deleted or migrated class-based object; and (7) object location means for locating the classless object IDs for all objects having a given value for a given field.

25 Claims, 13 Drawing Sheets

FIG.4A

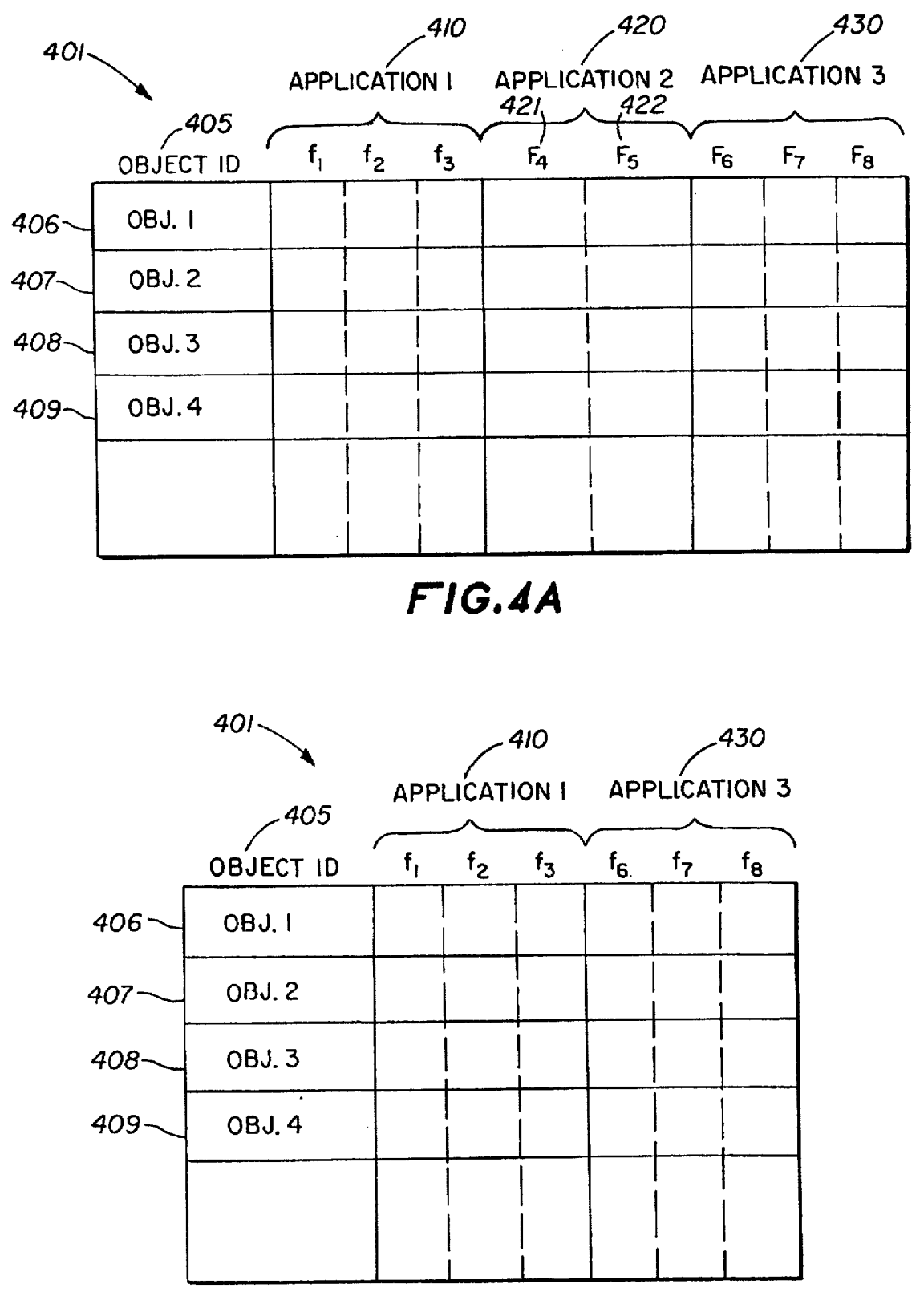

| OBJECT ID | APPLICATION 1 | | | APPLICATION 2 | | APPLICATION 3 | | |
|---|---|---|---|---|---|---|---|---|
| | $f_1$ | $f_2$ | $f_3$ | $F_4$ | $F_5$ | $F_6$ | $F_7$ | $F_8$ |
| OBJ. 1 | | | | | | | | |
| OBJ. 2 | | | | | | | | |
| OBJ. 3 | | | | | | | | |
| OBJ. 4 | | | | | | | | |
| | | | | | | | | |

FIG.4B

| OBJECT ID | APPLICATION 1 | | | APPLICATION 3 | | |
|---|---|---|---|---|---|---|
| | $f_1$ | $f_2$ | $f_3$ | $f_6$ | $f_7$ | $f_8$ |
| OBJ. 1 | | | | | | |
| OBJ. 2 | | | | | | |
| OBJ. 3 | | | | | | |
| OBJ. 4 | | | | | | |
| | | | | | | |

FIELD LOCATION TABLE

| FIELD_ID | MAPPED_TYPE |
|---|---|
| F1 | TRUE |
| F2 | FALSE |
| F3 | TRUE |
| | |

FIG.8

FIELD METHOD TABLE

| FIELD_ID | CLASS | METHOD | METHOD_TYPE |
|---|---|---|---|
| F1 | C1 | M1g | GET |
| F1 | C1 | M1s | SET |
| | | | |

FIG.9

IDENTIFICATION TABLE

| CLASSLESS_OBJECT_ID | CLASS_BASED_OBJECT_ID | CLASS |
|---|---|---|
| CID1 | CBID1 | C1 |
| CID2 | CBID2 | C2 |
| CID2 | CBID3 | C2 |
| | | |

FIG.10

OBJECT DESCRIPTION TABLE

| CLASSLESS_OBJECT_ID | | POINTER TO LIST |
|---|---|---|
| CID1 | | ↑ LIST 1 |
| CDI2 | | ↑ LIST 2 |
| | | |

FIG.11

OBJECT CONVERSION METHOD FROM A FLAT OBJECT SPACE TO A CLASS STRUCTURED SPACE

FIELD OF THE INVENTION

The present invention relates generally to object migration and conversion, and more particularly to a system for converting classless object data to class-based object data for allowing the coexistence of application programs based on a classless object model with application programs based on a class-based object model, and for use in the migration of classless object data to class-based object data.

BACKGROUND OF THE INVENTION

Data migration and backwards compatibility are issues faced by any evolving software application. A suitable context in which to illustrate the problems encountered by evolving software is in the area of network and system management. However, the present invention is by no means intended to be limited to the field of network and system management, and the following background is intended by way of illustration only.

Network and system management has become increasingly complex as systems have progressed from the simple network device management to full corporate enterprise environments. Faced with budget constraints, lack of staff resources, and skill limitations, network and system managers today are working to rapidly assimilate increasingly complex technology. The almost unbounded choice of connectivity options has led to complexity and fragmentation of network and system management responsibilities. The integrated network and system management solutions which have entered the marketplace have provided an economical alternative to the continued confusion caused by the proliferations of stand-alone, proprietary network and system management solutions. One such integrated network and system management solution is HP OpenView, developed and released by Hewlett-Packard Company, which provides a complete family of network and system management tools and services for local and wide area multivendor networks for integration on an industry-standard platform.

Integrated network and system management solutions generally operate as a distributed activity by decomposing the network and system management problem into several components, each component handling a different function. The HP OpenView architecture, for instance, comprises separate modules, including a communications infrastructure, a graphical user interface, management applications, management services, and managed objects.

Management services are the architectural component that act as a bridge between the network management communications infrastructure and the managed object. In the HP OpenView architecture, management services are realized through several elements: the communications protocols and interfaces necessary for communications with real resources, event forwarding and filtering services, a management data repository with structured query language (SOL) access, and data services.

Network systems must evolve over time to adapt to new user needs. Such evolution often requires major changes in the system platform, including changes in the system's internal architecture, implementation of the system internals, and in the modeling of the system's data. When a platform evolves, changes are required in the implementation of the many applications that use the platform and develop on it for integration of data, services and presentation. Often these applications are products of different and unrelated vendors.

One platform evolution that has become more and more frequent involves the migration from a classless object space platform to a class-based object space platform. In a system based on a classless object space and classless data model, a single object comprises a dynamic collection of fields, and is used to model all the different perspectives of a "real world" entity. For example, a single personal computer may function as both a personal workstation and a local area network server. Thus, in the classless object model, a single object in the database may represent both the workstation perspective and the local area network server perspective. Each perspective is managed by a different application.

Each application defines its own fields and sets values for those fields, but all on the same object. If another application manages a different aspect of the same personal computer, it may also define fields and set values on them for that same object.

Two disadvantages of the classless object structure, however, are its limitation in the realm of expandability and its conformance to standards. In the past few years, network systems have advanced technologically to allow large networks to manage many gigabytes of data distributed across many clients. Many applications require the use of a large database for allowing users to access, update and maintain information that is shared by many users. The traditional method, and one which is widely used among commercially available database management application program products, is a relational database. A relational database comprises tables of rows and columns. Each table defines a relation between the various items in each row. Every relational database has a query language for expressing commands to store and retrieve data. The most commonly used query language for accessing relational databases among commercially available products is SQL (Structured Query Language).

The problem with using an SQL in a classless model is the varying number of attributes that can be associated with an object. It is difficult to construct a schema that allows efficient searching on a dynamic set of columns. Commercially available SQL relational database products are best suited to a fixed number of class attributes in order to allocate space for each created object. The space is allocated statically in a table of rows and columns thereby facilitating an efficient indexing method for fast searching. Classless objects are thus inefficient with SQL products. Network management systems modeled on a class-based object space allow compatibility with commercially available SQL products.

The class-based object model is a central component of the object oriented architecture which is needed in order to support market requirements for system extensibility and distributibility. The classless object model was adequate for the earlier architecture which supported a smaller number of objects in a simpler local configuration. For the system to handle the new environment with thousands of objects, accessed simultaneously from numerous consoles, in a distributed environment, an object-oriented architecture is desirable. It is also needed for compatibility with the trend towards object oriented application programs available commercially. The object-oriented architecture requires a class-based object model as a replacement for the classless object model that may have been used to represent managed objects in the original architecture.

One problem encountered in the migration of data and applications from a classless object platform to a class-based object platform occurs when two or more applications enter into a data producer/consumer relationship. In this relationship, one application, the producer, populates the classless object database. A second application, the consumer, reads that data looking for specific fields. Finding a certain field value set on an object indicates to the consumer application that this object is of interest. The consumer application may add more data to the object, or it may simply read other fields of the object. For example, a producer application may be the Network Node Manager whose function is to discover and manage IP devices on the network. Consumer applications may then browse objects created by the Network Node Manager, and then add additional fields to the objects of interest. The functionality of the consumer application is triggered by data created by the producer application, creating a strong dependency of the consumer on the producer. This dependency must be satisfied in order for the consumer applications to run. In the past, migrating producer applications could not migrate until all consumer applications were also ready to migrate.

When a network and system management platform evolves from a classless object space to a class-based object space, the application developers must update the application to enable it to run on the new platform. In addition, the data associated with that application must be converted from the classless object model to the class-based object model. As each application migrates, it also migrates its data. However, as noted above, several applications may share common objects. In such circumstances, if one of these applications migrates, there is the possibility of data loss for the other. One way to insure no loss of data by any applications is for all applications with common objects to migrate simultaneously. However, this is difficult given the reality of multiple vendors, each with its own schedule constraints and application release plans. Thus it would be desirable to provide a method for allowing application programs using the same objects to migrate at different times; in other words, to allow producer applications to migrate from a classless to a class-based platform without the necessity of the simultaneous migration of all its consumer applications.

One solution to allowing applications to migrate when they become ready is to maintain two sets of data; namely, the original classless objects for use with the non-migrated application, and the migrated class-based objects for use with the migrated application. However, this space inefficiency, while merely a nuisance in a small network system managing fewer objects, becomes critical in a large system having tens of thousands of objects. The storage space requirements and management complexity increases proportionately as the number of application programs depending on the same objects in a network management system migrate at different times. Thus it would be desirable to provide a system for accessing a single version of the object data required by non-migrated classless object model applications, regardless of whether the producer application which created the objects has migrated to a class-based object platform, thereby avoiding unnecessary and cumbersome object duplication and management.

SUMMARY OF THE INVENTION

In accordance with the foregoing problems encountered in the art of software maintenance involving the migration of application programs and supporting coexistence of application programs based on the classless object data model with application programs based on the class-based object data model, it is an object of the invention to provide a system for migrating objects from a classless object space to a class based object space.

It is another object of the invention to provide an automatic object conversion system for providing transparent access to objects in the class-based object space by classless object based applications.

The invention herein described solves the problem of requiring the simultaneous migration of all applications sharing common data from a classless object model platform to a class-based object model platform. Classless objects and class-based objects coexist, and may be transparently accessed by non-migrated consumer classless object model applications which rely on objects produced by a migrated producer application.

The object conversion system provided herein allows for the coexistence of data and applications based on a classless object model with data and applications based on a class-based object model. An object based on the classless object model comprises at least a classless object ID and a plurality of fields. Each field is defined by a field definition and created by setting a value to the field. An object based on the class-based object model comprises a set of attributes and methods based on a defined class. The preferred embodiment described herein also requires a class-based object ID. The object conversion system comprises a set of procedures which operate on, update, and maintain a set of four tables. The set of four tables includes (1) a field location table for use in determining whether a field was created by a classless object model application or a class-based object model application; (2) a field method table for storing mappings from fields to both their corresponding class and method for access; (3) an identification table for storing the mapping between a classless object ID and its corresponding class-based object ID; and (4) an object description table for storing the mapping between a classless object ID to every field associated with that classless object ID.

The set of procedures comprises at least: (1) field creation means for creating a field; (2) field retrieval means for retrieving the value of a field; (3) field setting means for setting the value of a field; (4) object field retrieval means for retrieving the values of every field for a given classless object ID; (5) proxy object creation means for creating a classless object ID for a newly-created local class-based object 115; (6) proxy object deletion means for removing the classless object ID for a deleted or migrated class-based object; and (7) object location means for locating the classless object IDs for all objects having a given value for a given field_id.

A method for migrating classless objects to a class-based object space is also provided for use in conjunction with the object conversion system.

BRIEF DESCRIPTION OF THE DRAWING

An illustrative and presently preferred embodiment of the invention is shown in the accompanying drawings in which:

FIG. 4A depicts a typical local classless object database prior to migration of an application.

FIG. 4B depicts the local classless object database of FIG. 4A after migration of an application, specifically the migration of Application2.

FIG. 8 illustrates the preferred implementation of the field location table.

FIG. 9 illustrates the preferred embodiment of the field method table

FIG. 10 illustrates the preferred embodiment of the identification table.

FIG. 11 illustrates the preferred embodiment of the object description table.

DETAILED DESCRIPTION OF THE INVENTION

A system and method which achieves the aforementioned objectives in accordance with a presently preferred exemplary embodiment of the invention is described below with reference to FIGS. 1–19.

Figure 1:
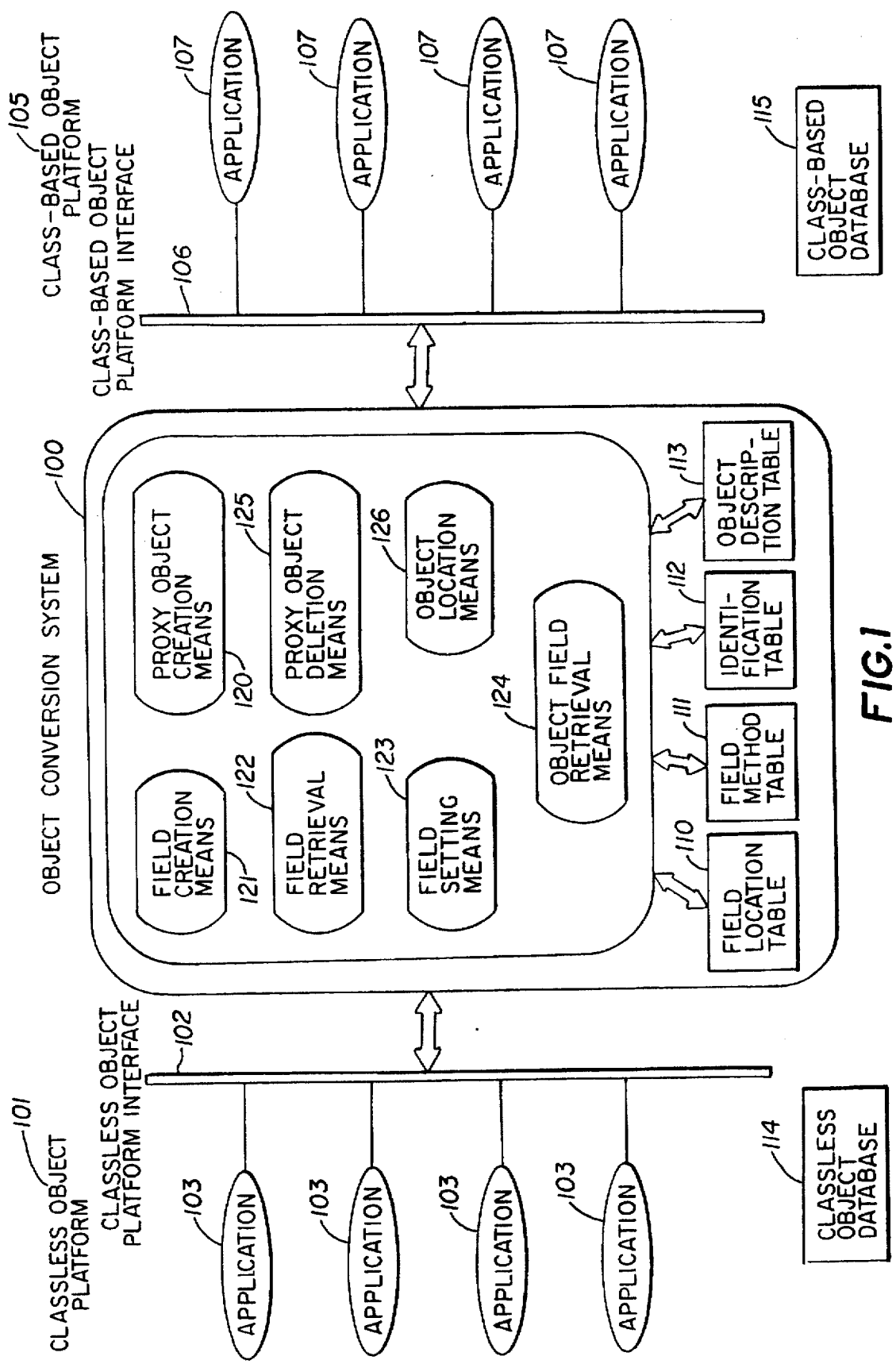
FIG. 1 is a block diagram of an object conversion system in accordance with the present invention.

FIG. 1 depicts an object conversion system 100 in accordance with the present invention which allows coexistence of data and applications utilizing a classless object model platform 101 with data and applications utilizing a class-based object model platform 105. The typical system on which the invention resides provides two different platforms—namely, a classless object platform 101 and a class-based object platform 105. Each platform provides an interface for accessing local data created by its own platform resident applications. Thus, the classless object platform 101 provides a classless object platform interface 102 and a local classless object database 114. Likewise, the class-based object platform 105 provides a class-based object platform interface 106 and a local class-based object database 115. Platform resident applications may access the database local to their respective platforms. The present invention allows access by classless object platform applications 103 to the contents of the databases of both platforms. In the preferred embodiment, the classless object platform interface 102 is implemented using a proprietary Applications Programmatic Interface (API), and the class-based object platform interface 106 is implemented using method calls (for all communication and data access).

Figure 2:
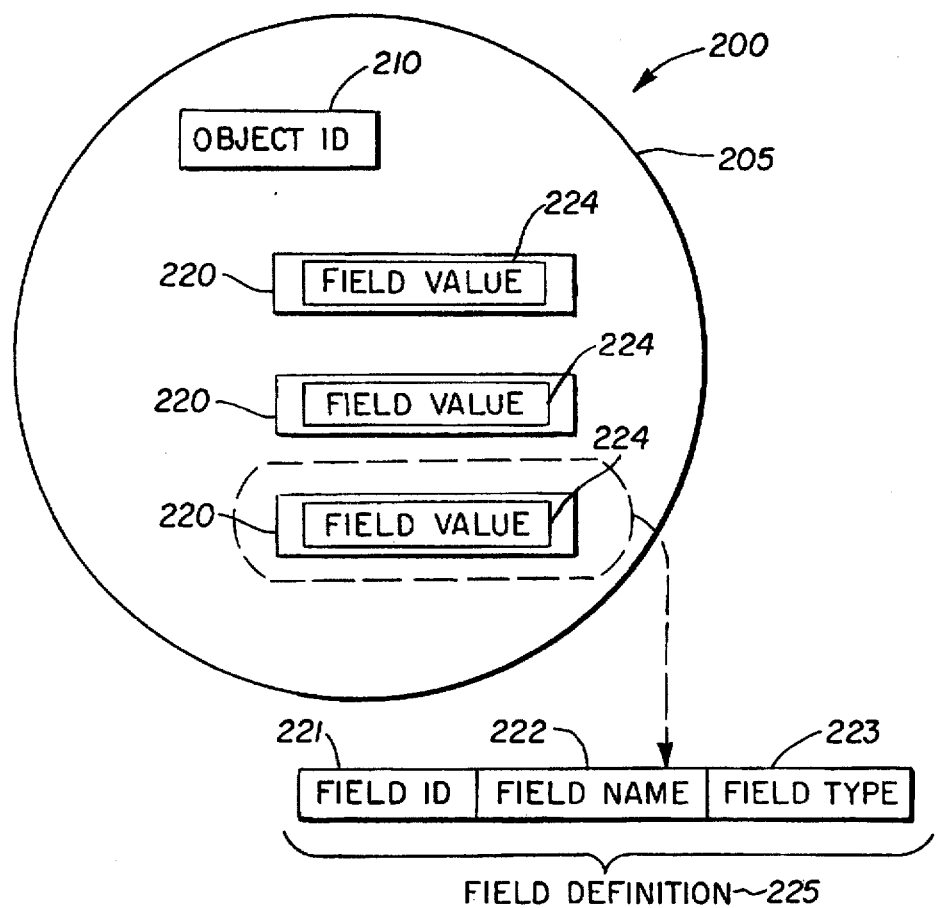
FIG. 2 depicts a typical classless object model.

A classless object 205 based on the classless object model 200, as shown in FIG. 2, is made up of a set of field values. A field value 224 can only be set for fields 220 that have been previously defined via a field definition 225. In the classless object model 200, objects are not defined by a class specification. Instead, a classless object 205, which is referenced by its classless object ID 210, comprises an arbitrary collection of fields 220. Thus, a classless object 205 is anything for which one or more fields 220 has been given a value. The number of fields 220 which any classless object 205 may have is dynamic and may vary freely. The structure of a classless object 205 is limited only by the number and type of fields 220 which have been defined for it. With the classless object model 200, a single classless object 205 may represent many different characteristics of a single real world entity (e.g., a classless object called PC may be an individual's workstation, and a file server).

In the preferred embodiment, every classless object 205 comprises at least a classless object ID 210 and a plurality of fields 220. A unique classless object ID 210 is assigned by the classless object platform 101 in the local classless object database 114 at the time of the object's creation. With reference to FIG. 1, in conjunction with FIG. 2, classless object model applications 103 create application-specific data by creating a field definition 225 for a field 220, and then assigning a field value 224 for the field 220 on classless objects 205 of interest. The preferred embodiment of a field definition 225 is also shown in FIG. 2, which includes a field_ID 221, a field_name 222, and a field_type 223. The field_ID 221 is used by the object conversion system 100 for referencing a field 220.

Figure 3:
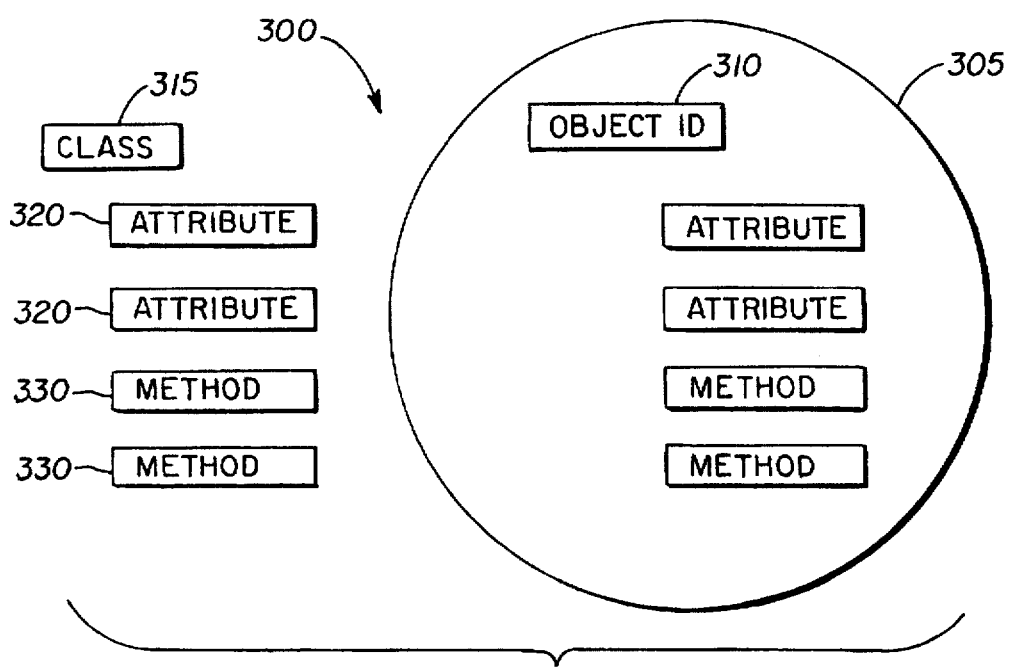
FIG. 3 depicts a typical class-based object model.

FIG. 3 illustrates a class-based object 305 based on the class-based object model 300. Class-based objects 305 are defined by a class 315, comprising definitions for attributes 320 and methods 330. A class-based object 305 is an instance of a class 315, making its attributes 320 static and fixed in type and number by the class definition 315. These class-based object properties facilitate predictability for space allocation and are thus compatible with commercially available SQL database application programs. With the class-based object model 300, any given class 315 or class-based object 305 represents only a single aspect of a real world entity.

The manipulation of a class-based object 305 is done through its defined methods 330. As known by those skilled in the art, an object's methods are procedures defined as part of the object's class 315 which operate as the object's interface for manipulating the object's attributes 320. The methods exposed by a class-based object 305 allows for controlled access to the attribute data.

Manipulation of data in the classless object model 200 is handled differently than in the class-based object model 300. Under the classless object model 200, the set of fields 220 available to any given classless object model application 103 is not limited only to its own defined fields 220. Rather, a classless object model application 103 may make use of fields 220 defined by any classless object model application 103. Thus, any classless object model application 103 can manipulate (i.e. set or unset) the values of fields 220 on any classless object 205 in the local classless object database 114, independent of which classless object model application 103 created the data. In the preferred embodiment, the classless object platform 101 utilizes proprietary API calls as its classless object platform interface 102 to manipulate a classless object 205 (i.e. create, delete, set and retrieve data) residing in the local classless object database 114.

Under the class-based object model 300, access to the attribute data 320 is through the methods 330 defined for the class 315 of which a given class-based object 305 is an instance. In the preferred embodiment, the class-based object platform interface 106 is implemented with a method interface which exposes methods to access data. The attribute data in the preferred embodiment is private. The only way to access an attribute 320 is through the method 330 exposed for it. This allows a class-based object model application 107 to control and manipulate only the attributes 320 of the class-based objects 305 for which it has defined a method 330.

Generally, a classless object model application 103 migrates from a classless object platform 101 to a class-based object platform 105 and becomes a class-based object model application 107. As described earlier, any classless object model application 103 can manipulate the values of fields 220 on any classless object 205 in the local classless object database 114, independent of which classless object model application 103 created the data. Further, any given classless object model application 103 may have other classless object model applications 103 which depend on the classless objects 205 which it created. Thus, due to the potential interdependencies of the classless object model applications 103 and their corresponding classless objects 205, a given classless object model application 103 cannot migrate to a different platform until all potentially dependent (i.e., consumer) classless object model applications 103 are also ready to migrate. In order to eliminate this requirement, it is both desirable and necessary for applications based on the classless object model 200 and applications based on the class-based object model 300 to coexist and it is this problem that the present invention solves.

A one-time data mapping must be utilized for the migration of data/applications from the classless object model 200 to the class-based object model 300. Since no class 315 definition exists for a classless object 205, determination of which set of fields 220 define a single perspective of a classless object 205 is not possible without the assistance of the application developers in determining 1) which objects must be migrated, 2) which new attributes 320 are equivalent to the old fields 220, and 3) the defined class 315 to which the application's data must be migrated. Thus, when an application migrates, the developer of that application must supply a one-time field-to-attribute mapping file specifying how access to each attribute, which replaces a previously defined field, can be obtained. Once a field-to-attribute mapping of old fields 220 to new class attributes 320 is provided, the process of migrating the fields 220 of a classless object model application 103 to the attributes 320 of a class-based object model application 107 can be accomplished through an automated process, such as a batch process implemented by a computer program. The present invention allows classless object model applications 103 to migrate from a classless object platform 101 to a class-based object platform 105 at the time the field-to-attribute mapping becomes available from the developer of a producer classless object model application 103 without having to wait for the simultaneous migration of every consumer classless object model application 103 potentially sharing common fields 220. Thus, the present invention allows the simultaneous coexistence of classless object model applications 103 with class-based object model applications 107 sharing common data.

FIGS. 4A and 4B show the effect on the local classless object database 114 of migrating a classless object model application 103 from the classless object platform 101 to the class-based object platform 105. In this figure, Application2 420 is migrating from the classless object platform 101 to the class-based object platform 105. FIG. 4A depicts an example local classless object database 401 prior to the migration of Application2 420. The example local classless object database 401 after migration is shown in FIG. 4B.

During application migration, the classless object model application 103 is replaced by the class-based object model application 107 and the application specific fields' values are unset in the local classless object database 114 by Application2 420. As more and more classless object model applications 103 migrate, the application specific data is continually removed from the local classless object database 114 until the local classless object database 114 eventually contains only the classless object IDs 210 for all the classless objects 205. Thus, as Application2 420 migrates from the example local classless object database 401 in FIG. 4A to the local class-based object database 115, it unsets its associated fields f4 421 and f5 422 from classless objects Obj1 406, Obj2 407, Obj3 408 and Obj4 409 in the local classless object database 401 in FIG. 4B. However, although the field values of f4 421 and f5 422 are unset after migration, the definitions for f4 421 and f5 422 still remain because non-migrated applications may still depend on those field definitions. As a result of the migration, f4 421 and f5 422 will be represented in the field method table 111.

Figure 5A:
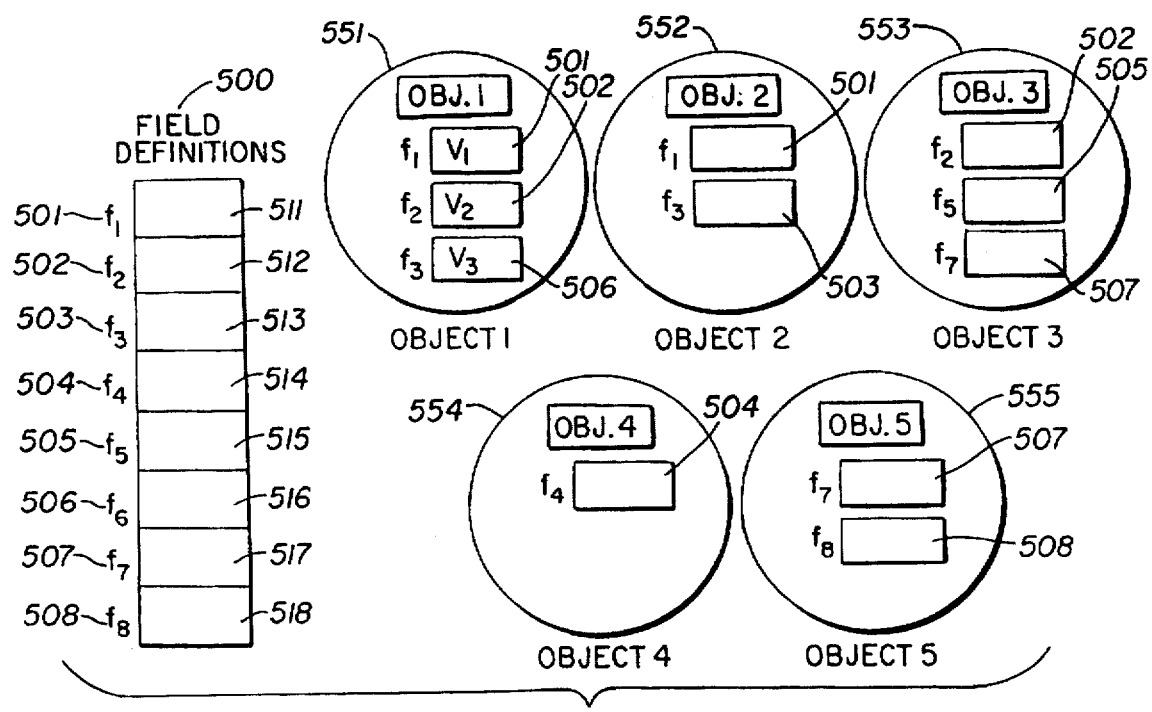
FIG. 5A depicts several example classless objects.

FIG. 5A depicts an example set of field definitions 500 and several example classless objects. As noted previously, a classless object 205 is a dynamic collection of fields 220. As shown in FIG. 5A, eight fields f1 through f8 (501 through 508) have been defined by various applications by field definitions 511 through 518, respectively. Any object may take on a value for any field. Thus, as shown in FIG. 5A, Object1 551 defines values for fields f1, f2 and f6 (501,502 and 506). Object2 552 defines values for f1 and f3 (501 and 503). Object3 553 defines values for f2, f5 and f7 (502, 505 and 507). Object4 554 defines values for the single field f4 (504). Finally, Object5 555 defines values for the fields f7 and f8 (507 and 508). As will be appreciated from FIG. 5A, some classless objects 205 defined by the classless object model applications 103 share common fields. For example, Object1 551 and Object2 552 both define values for field f1 504. Similarly, Object1 551 and Object3 553 both define values for field f2 502.

Figure 5B:
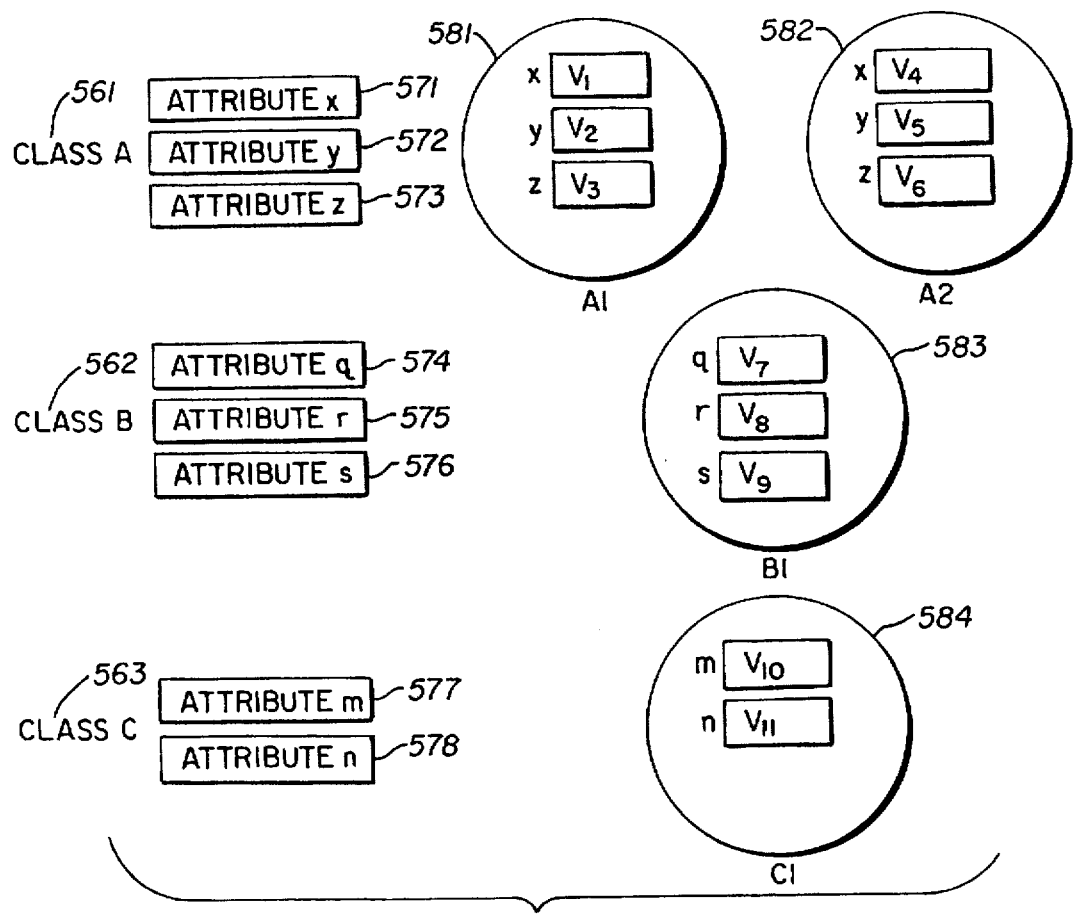
FIG. 5B depicts several example class-based objects.

FIG. 5B depicts several example class-based objects. As will be appreciated from FIG. 5B, the structure of a class is determined by its defined attributes; however, a class-based object does not exist until the class is instantiated. For example, with reference to FIG. 5B, Class A 561 is defined by its attributes x, y, and z (571,572 and 573). Class A 561 is merely a template for a class-based object 305, but is not itself a class-based object 305. A1 581 and A2 582 have become class-based objects 305 by instantiating Class A 561. Class-based object A1 581 has values v1, v2 and v3 set for attributes x, y and z, respectively. Similarly, object A2 582 has values v4, v5 and v6 set for attributes x, y and z, respectively. As also shown in FIG. 5B, object B1 583 is an instance of Class B 562 having attributes q, r and s (574, 575 and 576) with values v7, v8 and v9, respectively. Similarly, object C1 584 is an instance of Class C 563 having attributes m and n (577 and 578) with values v10 and v11, respectively.

Figure 6:
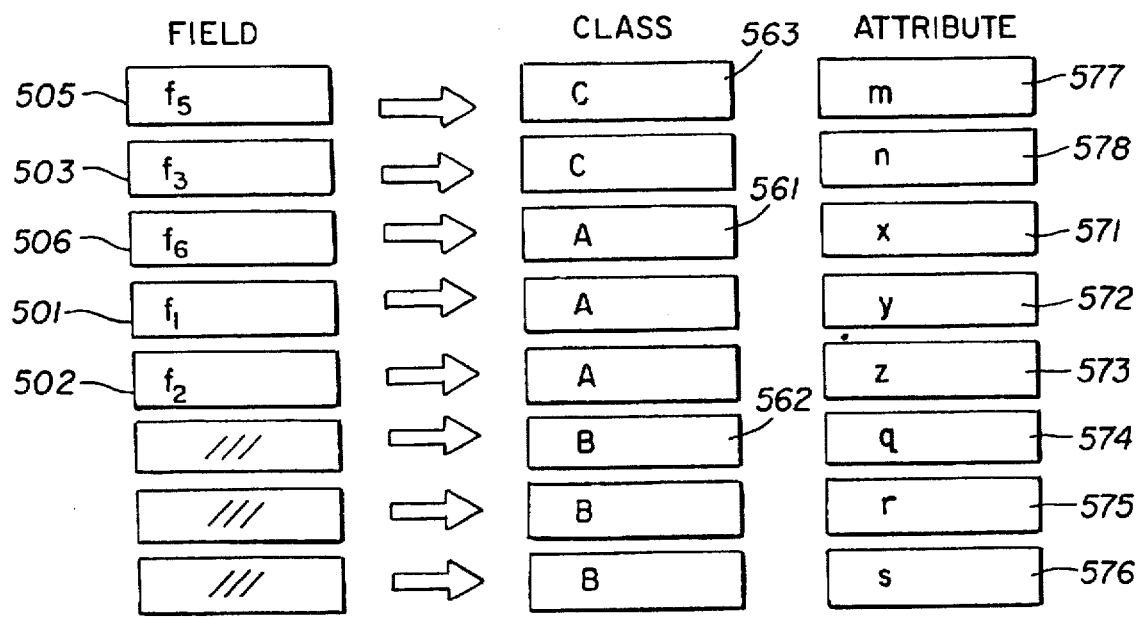
FIG. 6 illustrates an example field-to-attribute mapping.

In accordance with the present invention, the developer of the migrating classless object model application 103 shall provide a set of mappings from the class attributes 320 to the classless object fields 220 wherever they are equivalent. For example, FIG. 6 illustrates an example field-to-attribute mapping of Class C 563 from FIG. 5B, wherein the classless object field f5 505 of FIG. 5A maps to the m attribute 577 in Class C 563. Similarly, field f3 503 maps to the n attribute 578 in Class C 563. Likewise, field f6 506 maps to the x attribute 571 in class A 561; field f1 501 maps to the y attribute 572 in class A 561; and field f2 502 maps to the z attribute 573 in class A 561.

As also appreciated from FIG. 6, it is possible that there are no fields 220 which map to an attribute 320. A situation where no classless object field 220 maps to an attribute 320 in a class 315 occurs when the attribute 320 is new. Thus, from FIG. 5A and 5B, the q attribute 574 in Class B 562, which has no fields 220 mapped to it, is new; similarly, the r attribute 575 and the s attribute 576 in Class B 562 are also new.

Fields not appearing in the field-to-attribute mapping file represent fields that are defined by non-migrated applications. In FIG. 6, only fields which have been migrated, including f1 501, f2 502, f3 503, f5 505 and f6 506, appear in the file. Fields f4 504, f7 507 and f8 508 from FIG. 5A do not appear in the mapping file in FIG. 6 because they belong to applications which have not yet been migrated. In other words, classless objects Object 4 554 and Object5 555 cannot be migrated yet since no class 315 supports its attributes 320.

In the preferred embodiment, the field-to-attribute mappings are provided by the application developers via a field registration file. The registration file provides the object conversion system 100 with a mapping of classless object fields 200 to class-based object attributes 320. Once the mappings are obtained, the migration occurs through the instantiation of class-based objects 305 with the values of the migrating fields 220.

Figure 7:
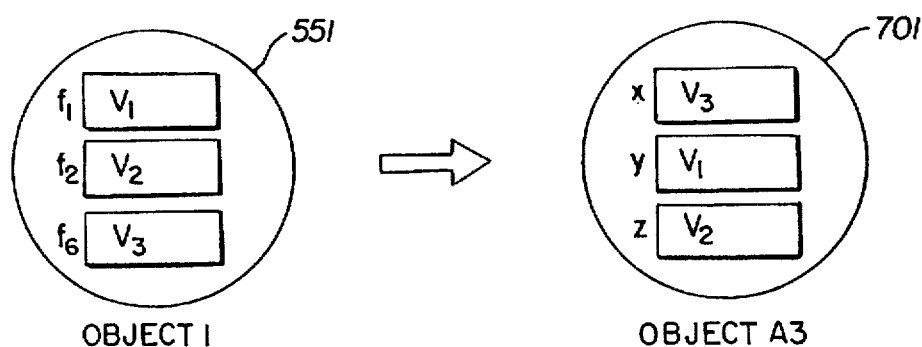
FIG. 7 illustrates the creation of a new class-based object.

For example, with reference to flat Object1 551 having fields f1, f2 and f6 (501, 502 and 506) as depicted in FIG. 5A, Class A 561 as defined in 5B, and the field-to-attribute mapping as defined in FIG. 6, a new object A3 701 is instantiated as depicted in FIG. 7. Thus, since field f1 501 maps to attribute y 572 of Class A 561, field f2 502 maps to attribute z 572 of Class A 561, and field f6 506 maps to attribute x 571 of Class A 561, the data is migrated by instantiating the object A3 701 and, via the object's methods, setting the attributes y, z and x (572, 573 and 571) to the values of fields f1, f2 and f3 (501, 502 and 503). Thus, in more symbolic terms:

$$\text{Since } f1 \rightarrow \text{attribute } y$$
$$f2 \rightarrow \text{attribute } z$$
$$f6 \rightarrow \text{attribute } x$$

the instantiation of object A3 701 allows for data migration as follows:

attribute x=value f6=v3
attribute y=value f1=v1
attribute z=value f2=v2.

As applications migrate from the classless object model 200 to the class-based object model 300, each classless object model application 103 moves only the data specific to it, leaving all other data on the classless object 205 alone (since the remaining fields 220 belong to other classless object model applications 103). As migrating classless object model applications 103 move their data fields 220 from the classless objects 205, they unset the value of those fields 220 of the classless objects 205 in the local classless object database 114. The present invention allows access by the remaining non-migrated classless object model applications 103 to the fields 220 which have been migrated.

In accordance with the present invention, and with reference to FIG. 1, the object conversion system 100 comprises a set of four tables, which, in combination with a set of procedures described hereinafter allow access to data in both the local classless object database 114 and the local class-based object database 115 by non-migrated classless object model applications 103. The set of four tables comprises: (1) a field location table 110 for use in determining whether a field 220 was created by a classless object model application 103 or a class-based object model application 107; (2) a field method table 111 for storing mappings from fields 220 to both their corresponding class 315 and method 330 for access; (3) an identification table 112 for storing the mapping between a classless object ID 210 and its corresponding class 315 and class-based object ID 310; and (4) an object description table 113 for storing the mapping between a classless object ID 210 to every field 220 associated with that classless object ID 210.

The field location table 110 contains information for determining what type of application defined a certain field 220; i.e., whether the field 220 was created by a non-migrated application or a migrated application. This information is used for determining whether the field is mapped or unmapped. Thus, if the field 220 was created by a non-migrated application, it is unmapped and resides in the local classless object database 114. If the field 220 was created by a migrated application, it is mapped, and resides in the class-based object database 115. FIG. 8 illustrates the preferred implementation of the field location table 110, comprising a lookup table indexed by field_ID 221, and a boolean mapped_type 802. The mapped_type 802 is set to TRUE when the application which created the field 220, referenced by its field_ID 221, has been migrated to the class-based object platform 105. The mapped_type 802 is set to FALSE when the application which created the field 220 has not been migrated and resides on the classless object platform 101.

The field method table 111 contains the mappings from classless object fields 220 to their corresponding class attributes 320. In the preferred embodiment, as illustrated in FIG. 9, the field method table 111 contains the mappings from fields 220 to both their corresponding class 315 and its method 330 for access. The field method table 111 contains a mapping from the field 220 to the class 315 of class-based object 305 in order to ascertain what type of object to invoke a method on. The field method table 111 also contains a mapping from the field 220 to its method 330 for access because a query on the field translates to a method call on that class-based object 305. The present invention operates on private attributes which allow access only through associated methods. Thus, the field 220 maps to an attribute which is set to the field value, but access to the attribute is available only indirectly through its associated method. Accordingly, in the preferred embodiment, the field method table 111 contains a mapping from a field 220, referenced by its field_ID 221, to its corresponding class 315 and method 330 rather than to its corresponding attribute 320. The preferred embodiment is implemented with a lookup table indexed by the field_ID 221 and method_type 904. The method_type 904 is an enumerated type having at least the values of GET and SET (denoting whether its associated method's operation involves getting or setting the field_value 224). The class 315 and method 330 for each field_ID 221 and method_type 904 are also contained in the field method table 111.

The identification table 112 stores the mapping between a classless object ID 210 and its corresponding class-based object ID 310 and associated class 315. The identification table 112 is required because new object identifiers are created when a classless object 205 is migrated to the class-based object platform 105. Since a non-migrated classless object model application 103 identifies the classless object 205 (one or more of whose fields 220 may have been migrated) by its classless object ID 210, the mapping to the corresponding class-based object ID 310 is critical for locating those fields 220 in the class-based object database 115. The preferred embodiment is shown in FIG. 10, and is implemented with a lookup table indexed by classless object ID 210. For each classless object ID 210, the identification table 112 contains its corresponding class-based object ID 310 and associated class 315. A one-to-one mapping may not exist between the classless object IDs 210 and the class-based object IDs 310 in the identification table 112 since each classless object may have fields mapped to attributes contained in different classes.

The object description table 113 contains the mapping between a classless object ID 210 and every field 220 associated with that classless object ID 210. This table enables classless object queries by classless object model applications 103 which key off of an entire classless object ID 210, and allows the determination of all of the fields 220 for any given classless object 205. The preferred embodiment is illustrated in FIG. 11, and is implemented with a lookup table indexed by the classless object ID 210 and, for each entry in the table, contains a pointer 1102 to a linked list of all the fields 220 associated with that classless object ID 210.

Also in accordance with the present invention, a set of procedures operate on, update, and maintain the set of four tables, thereby allowing access to data in both the local classless object database 114 and the local class-based object database 115 by non-migrated classless object model applications 103 relying on data from a class-based object model application 107. The set of procedures comprises at least: (1) field creation means 121 for creating a field 220; (2) field retrieval means 122 for retrieving the value of a field 220, both mapped and unmapped; (3) field setting means 123 for setting the value of a field 220; (4) object field retrieval means 124 for retrieving the values of every field 220 for a given classless object ID 210; (5) proxy object creation means 120 for creating a classless object ID 210 for a newly-created local class-based object 115; (6) proxy object deletion means 125 for removing the classless object ID 210 for a deleted or migrated class-based object 305; and (7) object location means 126 for locating the classless object IDs 210 for all classless objects 114 and class-based object 115 having a given value for a given field 220.

The field creation means 121 for creating a field 220 is called by class-based object model applications 107 for allowing the attributes 320 it creates to be visible as fields 220 to the non-migrated classless object model applications 103. Only non-migrated classless object model applications 103 use field_definitions 225, and the interface for creating fields by non-migrated applications does not change in the present invention. However, classless object model applications 103 depend on field_definitions 225 created by other applications, even after those other applications have migrated. Therefore, migrated applications must represent their fields so that non-migrated applications can access them. When a migrated application creates a new class-based object 305 having an attribute 320 to which a field 220 has been mapped, it must make this newly created "field" visible to classless object model applications 103. In accordance, the field creation means 121 provides access information indicating that the new field 220, referenced by its field_id 221, has been mapped to the class-based object database 115 and indicating the class 315 to which it belongs and its method of access. This is accomplished by adding an entry to the field location table 110 and to the field method table 111.

Figure 12:
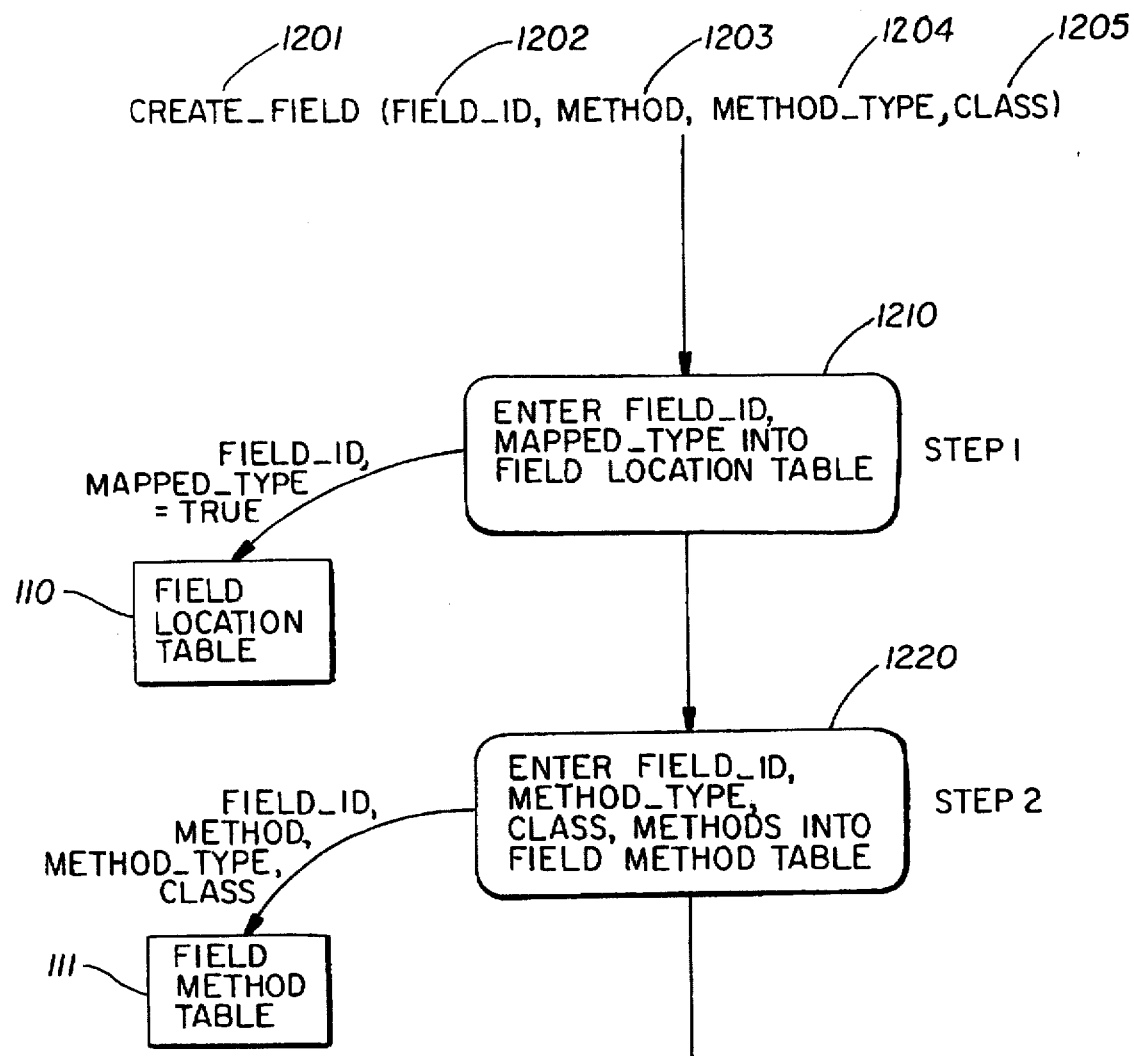
FIG. 12 is a flow diagram of the preferred embodiment of the field creation means.

FIG. 12 shows the preferred embodiment of field creation means 121. As illustrated in FIG. 12, the field creation means 121 comprises a procedure, create_field 1201, which accepts as input a field_ID 1202, a method 1203, a method_type 1204, and a class 1205. In STEP1 1210, the create_field procedure 1201 creates a new entry into the field location table 110. The entry comprises the input field_ID 1202 and a mapped_type 802 of TRUE, designating that the field has been mapped. In addition, an entry must be made in the field method table 111. The entry into the field method table 111, as shown in STEP 2 1220, comprises for each separate method_type 1204 (e.g., GET or SET), the field_ID 1202, the class 1205, the method 1203, and the method_type 1204. The field method table 111 contains the actual field-to-attribute mappings, whereby the attributes are accessed through the methods.

The field retrieval means 122 for retrieving the value of a field 220 is utilized by classless object model applications 103 for retrieving the field_value 224 of a field 220. The field may have been migrated to the class-based object platform 105 and thus is maintained as an attribute 320 of a class-based object 305 for a defined class 315 in the class-based object database 115, or the field 200 may not have been migrated and thus resides in the local classless object database 114.

Figure 13:
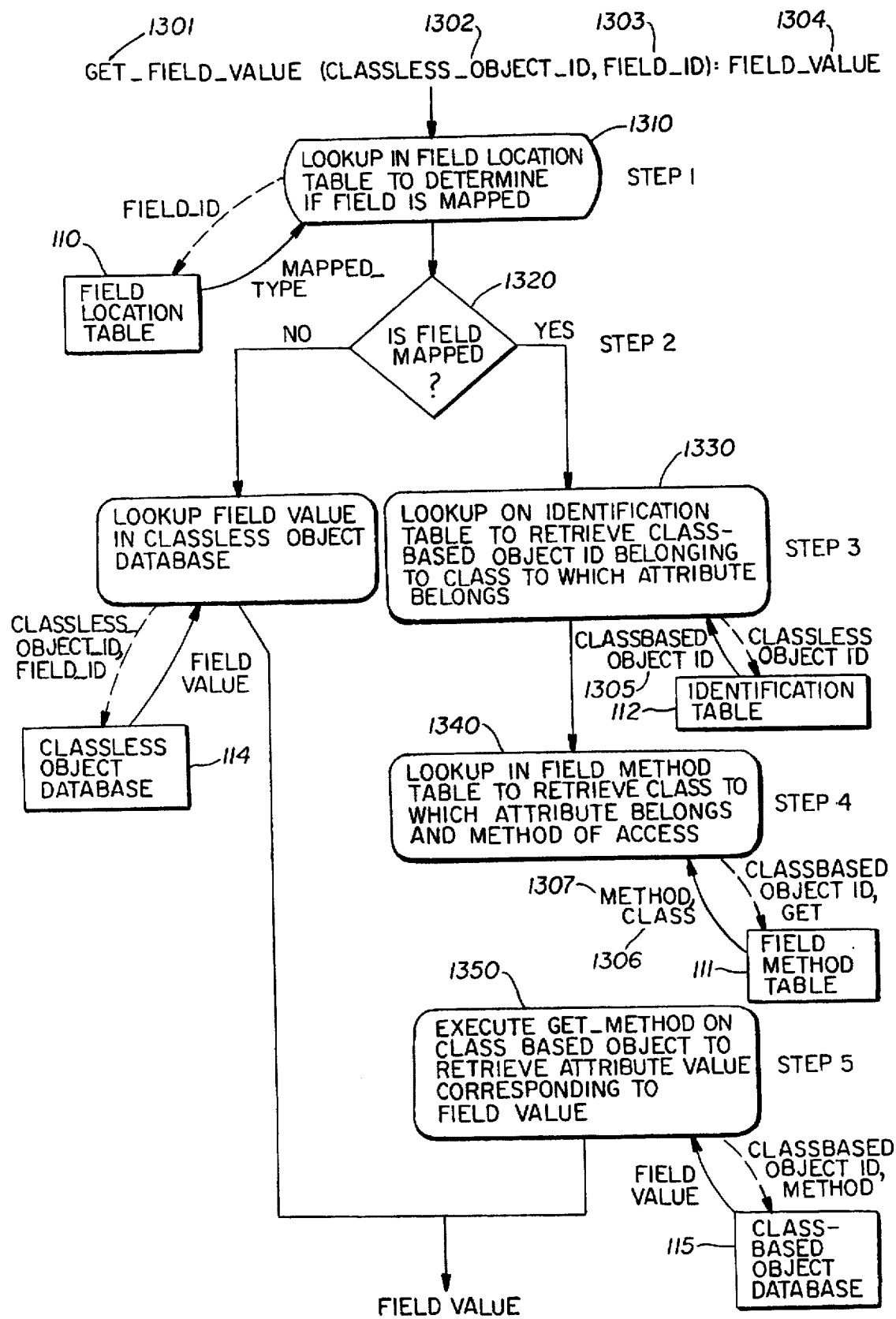
FIG. 13 is a flow diagram of the preferred embodiment of the field retrieval means.

FIG. 13 illustrates the preferred embodiment for the field retrieval means 122. As illustrated in FIG. 13, the field retrieval means 122 comprises a procedure, get_field_value 1301, which accepts as input a classless object ID 1302 and a field_ID 1303. In STEP 1 1310, the field retrieval means 122 performs a lookup on the field location table 110, keying off the field_ID 1303 and retrieving the value of the mapped_type 802 (i.e., whether the application which created the field has been mapped or not). In STEP 2 1320, if the field has not been mapped, designated by a value of FALSE for the mapped_type 802, the get_field_value procedure 1301 performs a lookup on the local classless object database 114 to retrieve the field_value 1304 and return it to the classless object model application 103. If the field 220 has been mapped, designated by a value of TRUE for the mapped_type 802, the get_field_value procedure 1301 performs a lookup on the identification table 112 in STEP 3 1330 to retrieve the class-based object ID 1305 corresponding to the input classless object ID 1302. The corresponding class-based object ID 1305 is required for locating the correct class-based object in the class-based object database 115. Next, in STEP 4, the get_field_value procedure 1301 performs a lookup on the field method table 111, keying off the field_ID 1303 and method_type 904 of GET in order to determine the class 1306 and method 1307 for retrieving the field_value 1304. The field_value 1304 is retrieved in STEP 5 1350 via a call on class-based object ID 1305 with method 1307 (i.e., object_ID.GET_method returns the field_value 1304). The field_value 1304 is then returned to the calling classless object model application 103.

The field setting means 123 for setting the value of a field 220 is utilized by classless object model applications 103 for setting the field_value 224 of a field 220, whether the field 200 resides in the local classless object database 114, or whether the field 220 has been migrated to the class-based object platform 105 and thus is maintained as an attribute 320 of a class-based object 305 for a defined class 315 in the class-based object database 115.

Figure 14:
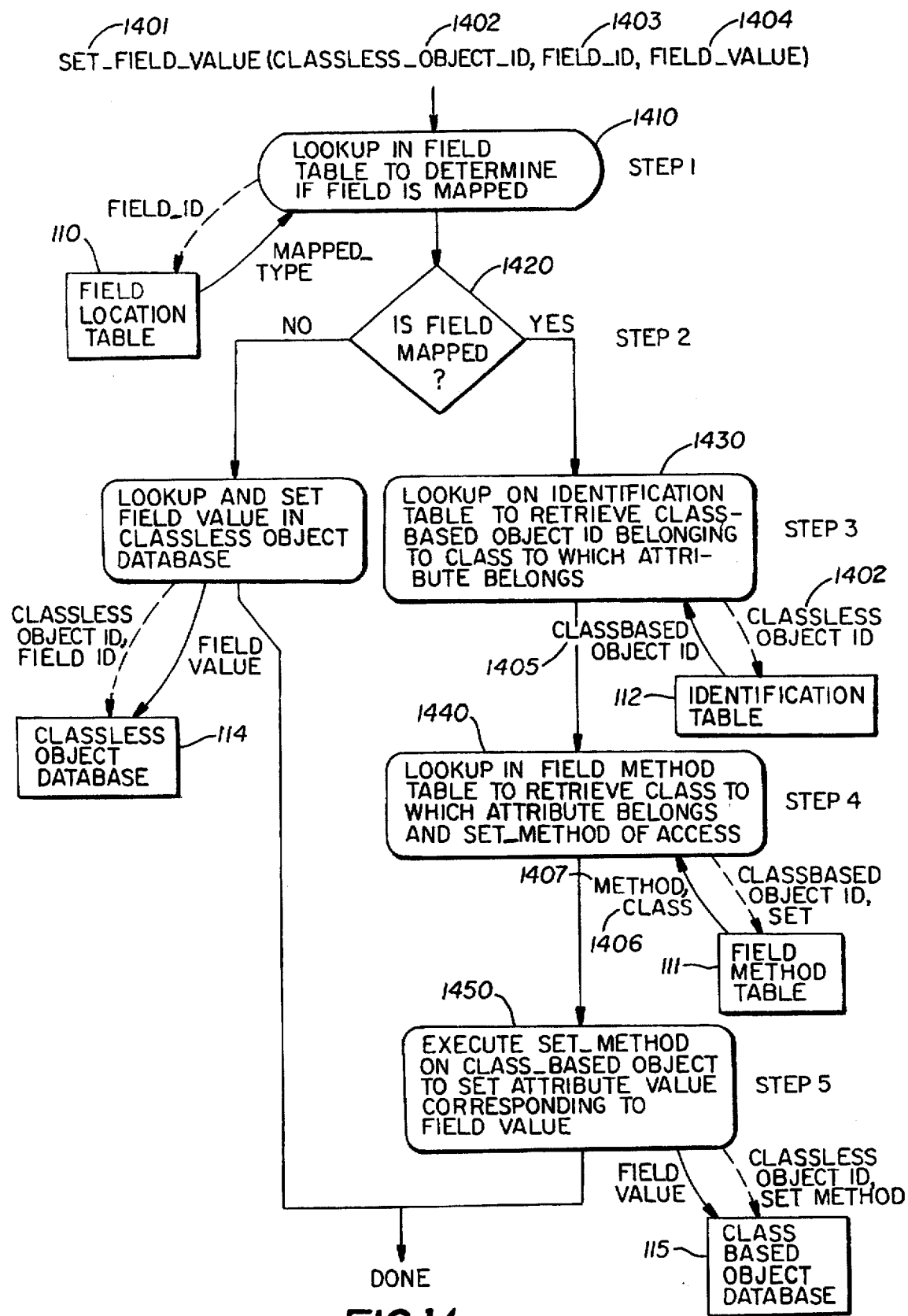
FIG. 14 is a flow diagram of the preferred embodiment of the field setting means.

FIG. 14 shows the preferred embodiment of the field setting means 123. As illustrated in FIG. 14, the field setting means 123 comprises a procedure, set_field_value 1401, which accepts as input a classless object ID 1402, a field_ID 1403, and a field_value 1404. In STEP 1 1410, the set_ field_value procedure 1401 performs a lookup on the field location table 110, keying off the field_ID 1403 and retrieving the value of the mapped_type 802 (i.e., whether the application which created the field has been mapped or not). In STEP 2 1420, if the field has not been mapped, designated by a value of FALSE for the mapped_type 802, the set_field_value procedure 1401 performs a lookup and set on the local classless object database 114 to set the field_value 1404. If the field 220 has been mapped, designated by a value of TRUE for the mapped_type 802, the set_field_value procedure performs a lookup in STEP 3 1430 on the identification table 112 to retrieve the corresponding class-based object ID 1405 for the input classless object ID 1402. The corresponding class-based object ID 1405 is required for locating the correct object in the class-based object database 115. Next, in STEP 4 1440, the set_field_value procedure 1401 performs a lookup on the field method table 111, keying off the field_ID 1403 and a method_type 904 of SET in order to determine the class 1406 to which the field is mapped and the method 1407 for setting the value of the attribute to the input field_value 1404. The value of the attribute corresponding to the input field_ID 1403 is set to the input field_value 1404 in STEP 5 1450 via a call on the class-based object ID 1405 with method 1407. After setting the value of the attribute to the field_value 1404, the set_field_value procedure 1401 returns to the calling classless object model application 103.

The object field retrieval means 124 is utilized by classless object model applications 103 for retrieving the values of every field 220 for a given classless object ID 210, whether the fields 220 have been migrated to the class-based object platform 105, or whether the field 200 resides in the local classless object database 114.

Figure 15:
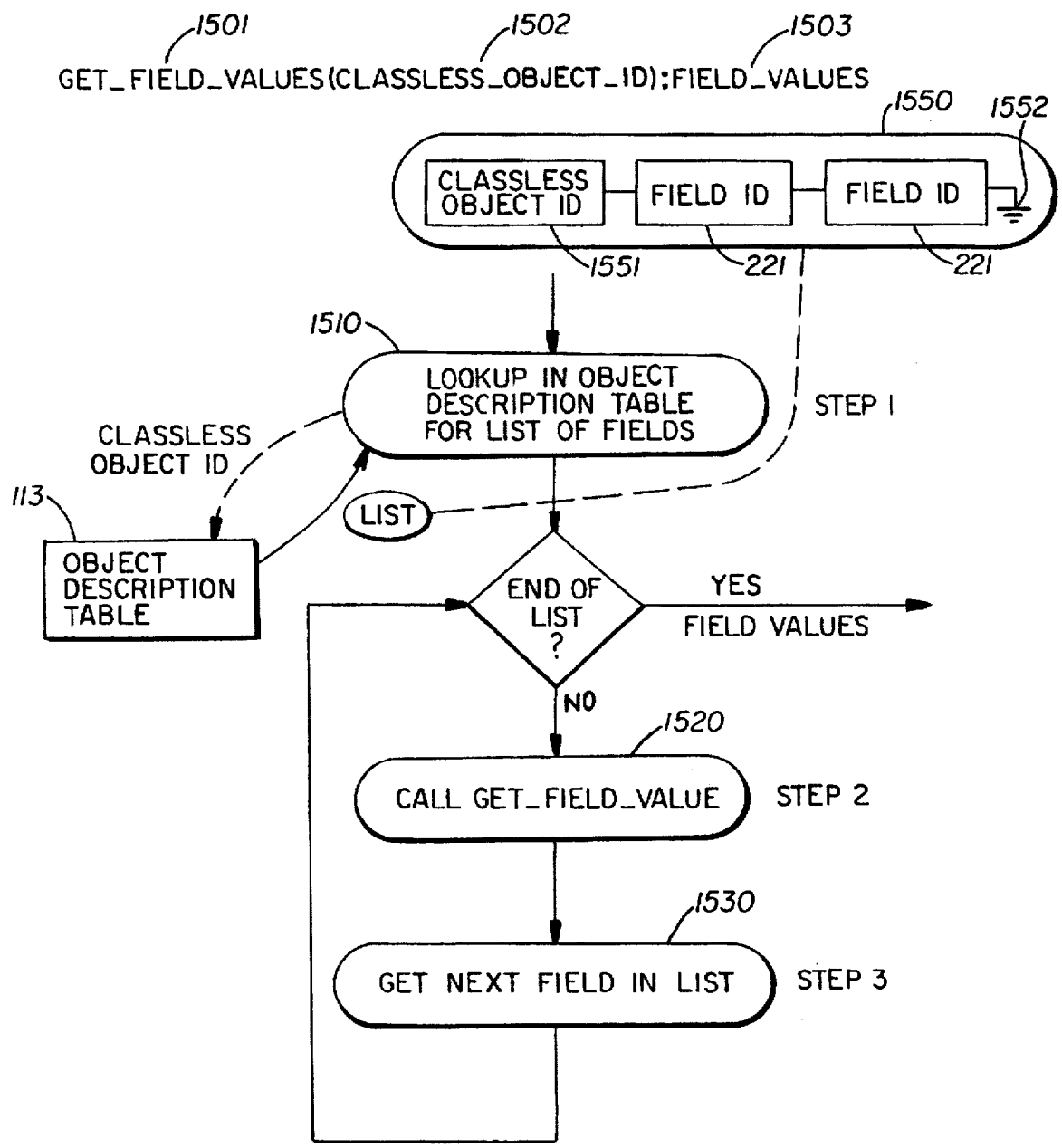
FIG. 15 is a flow diagram of the preferred embodiment of the object field retrieval means.

FIG. 15 shows the preferred embodiment of the object field retrieval means 124. As illustrated in FIG. 15, the object field retrieval means 124 comprises a procedure, get_field_values 1501, which accepts as input a classless object ID 1502, and which upon completion returns the field_values 1503 for each of its associated fields. In STEP 1 1510, the get_field_values procedure 1501 performs a lookup on the object description table 113 to obtain the pointer 1551 to a linked list 1550 of field_IDs 221 associated with the input classless object ID 1502. If the pointer 1551 points to an empty list, the classless object ID 1502 has no fields associated with it, and the get_field_values procedure 1501 returns to the calling classless object model application 103. If the linked list 1550 is not empty, the pointer 1551 points to the first field_ID 221 in the list.

In STEP 2 1520, the get_field_values procedure 1501 calls the get_field_value procedure 1301 with the first field_ID 221 in the list 1550 to obtain its field_value 1503.

In STEP 3 1530, the get_field_values procedure 1501 increments the pointer in the linked list 1550 to retrieve the next field_ID 221 associated with the input classless object ID 1502. If the pointer points to the end of the list 1552, all the fields associated with the classless object ID 1502 have been retrieved, and the get_field_values procedure 1501 returns all the retrieved field values 1503 to the calling classless object model application 103. If the pointer points to another field_ID 21, the get_field_values procedure 1501 repeats STEPS 2 1520 and STEP 3 1530. This process continues until the pointer points to the end of the list 1552. Then the get_field_values procedure 1501 returns all the retrieved field values 1503 to the calling classless object model application 103.

Figure 16:
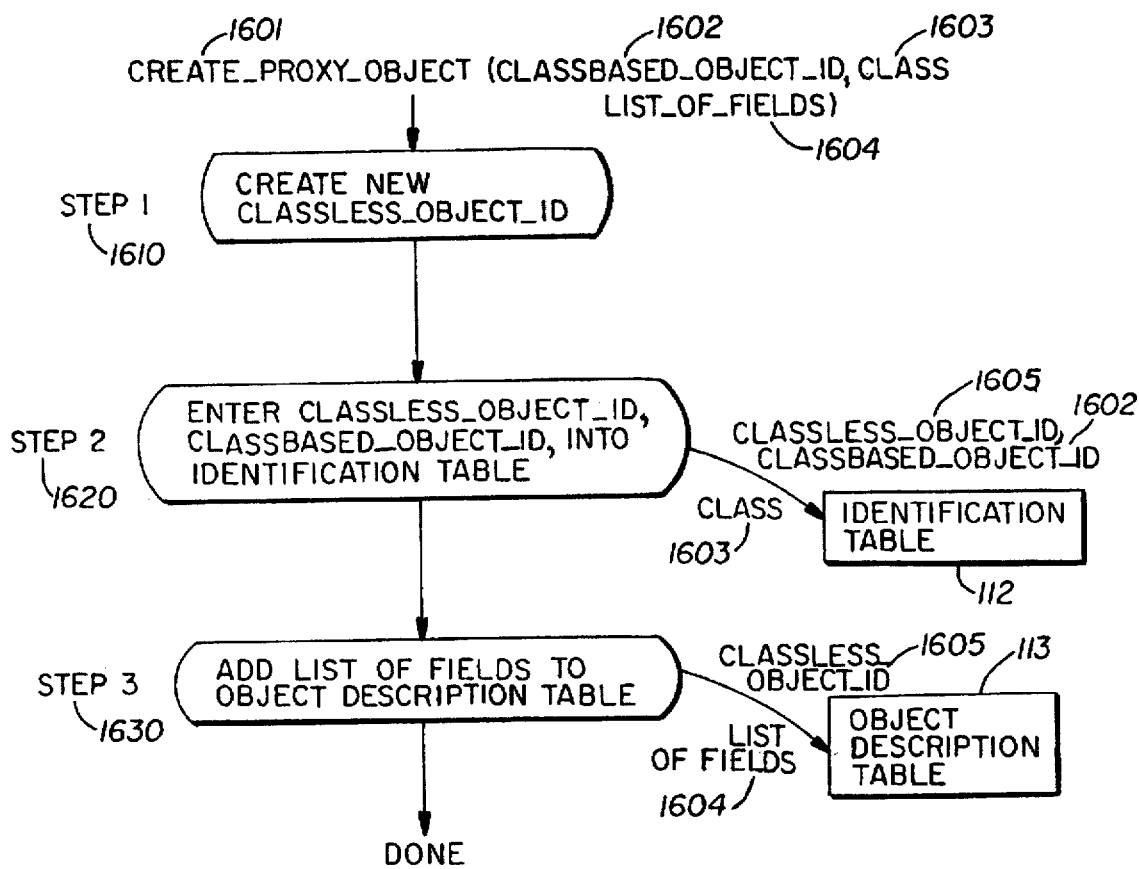
FIG. 16 is a flow diagram of the preferred embodiment of the proxy object creation means.

The proxy object creation means 120 is utilized by class-based object model applications 107 to create a classless object ID 210 for allowing access to a newly-created local class-based object 115 by classless object model applications 103. FIG. 16 illustrates the preferred embodiment of the proxy object creation means 120. The preferred embodiment comprises a procedure, create_proxy_object 1601, which accepts as input a class-based object ID 1602, the corresponding class 1603 to which it belongs, and a list of fields 1604. In STEP 11 61 0, the create_proxy_object procedure 1601 creates a new classless object ID 1605 for use by classless object model applications 103. Next, in STEP 2 1620, the create_proxy_object procedure 1601 adds an entry into the identification table 112, whereby the entry comprises the newly created classless object ID 1605, the input class-based object ID 1602, and the input class 1603. The object description table 113 is updated in STEP 3 1630 with an entry comprising the newly created classless object ID 1605 and the input list of fields 1604. The create_proxy_object procedure 1601 then returns to the calling class-based object model application 107.

Figure 17:
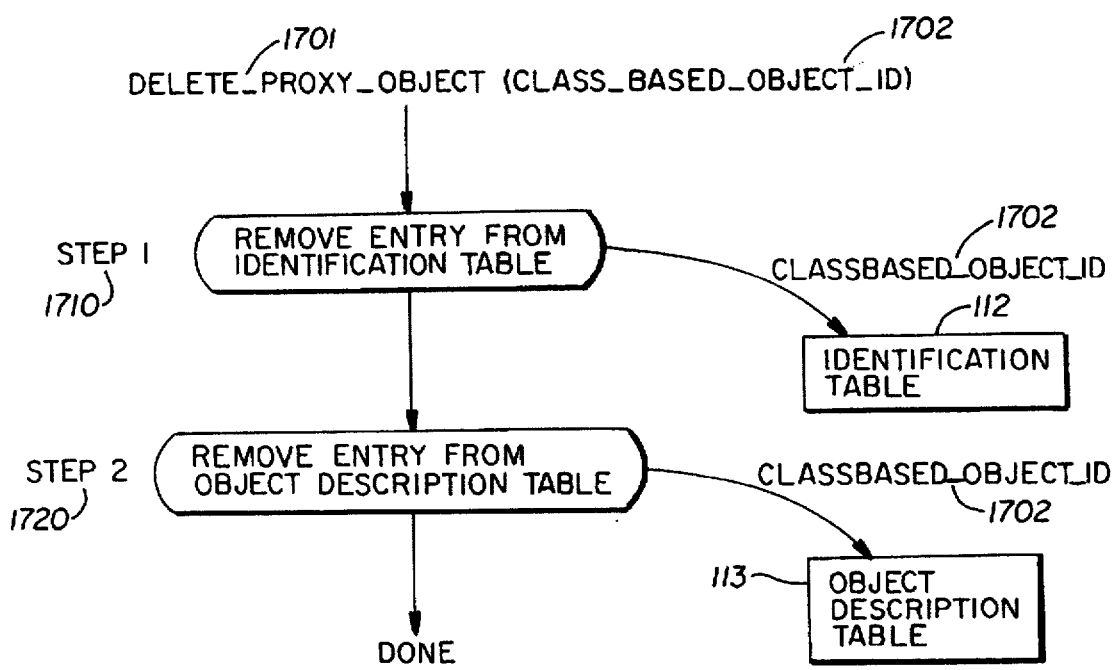
FIG. 17 is a flow diagram of the preferred embodiment of the proxy object deletion means.

The proxy object deletion means 125 is utilized by class-based object model applications 107 to remove a classless object ID 210 corresponding to a deleted class-based object 305. FIG. 17 illustrates the preferred embodiment of the proxy object deletion means 125. The preferred embodiment comprises a procedure, delete_proxy_object 1701, which accepts as input a class-based object ID 1702. The delete_proxy_object procedure 1701, in STEP 1 1710, removes all entries in the identification table 112 in which the input class-based object ID 1702 appears. Similarly, in STEP 2 1720, the delete_proxy_object procedure 1701 removes all entries in the object description table 113 in which the input class-based object ID 1702 appears. The delete_proxy_object procedure 1701 then returns to the calling class-based object model application 107.

The object location means 126 is utilized by classless object model applications 103 for locating the classless object IDs 210 for all classless objects 114 having a given value for a given field 220. The preferred embodiment, shown in FIG. 18, is implemented with a procedure, locate_object 1801, which accepts as input a field_ID 1802 and a field value 1803.

Figure 18:
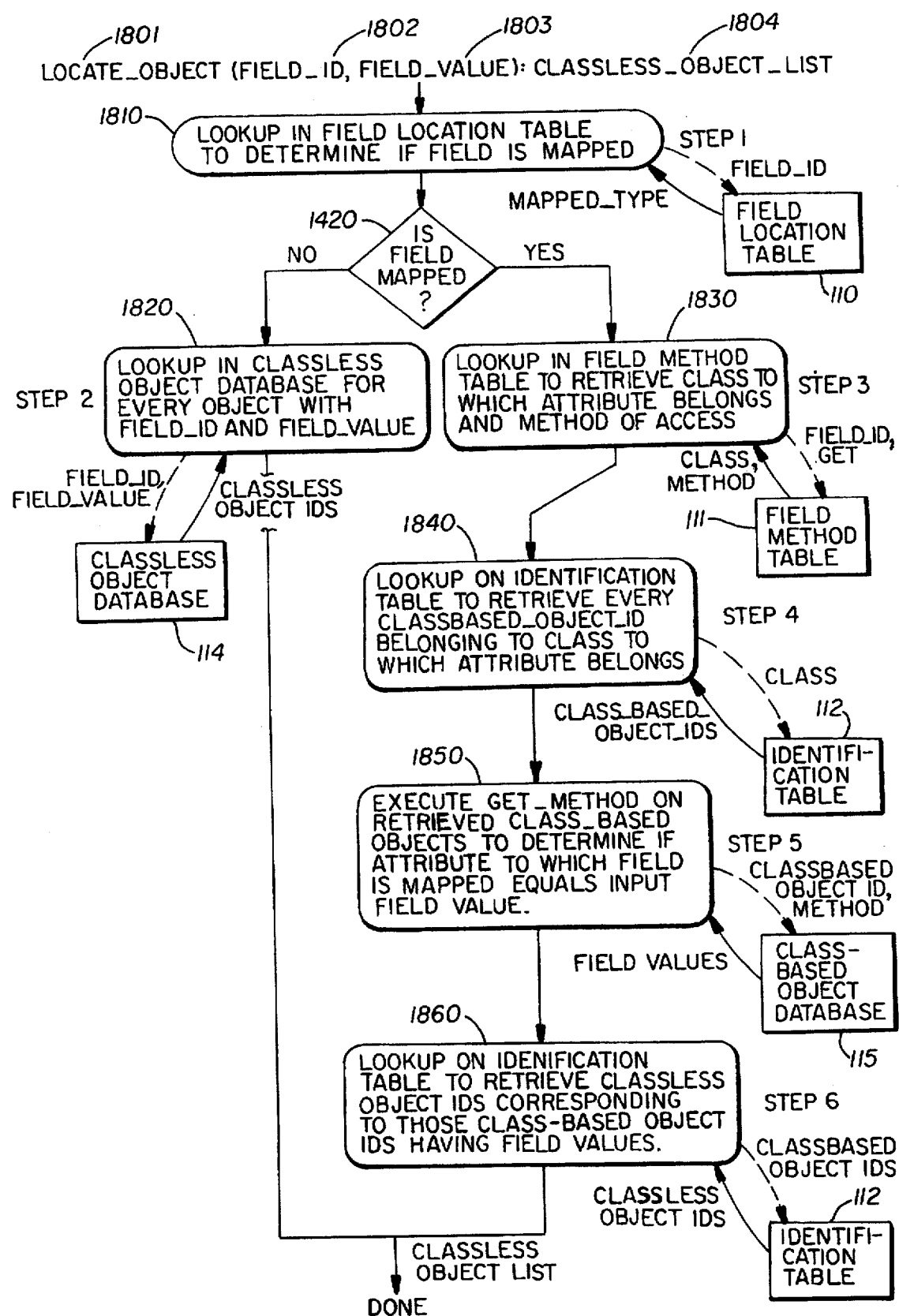
FIG. 18 is a flow diagram of the preferred embodiment of the object location means.

In STEP 1 1810, as shown in FIG. 18, the locate_object procedure 1801 performs a lookup on the field location table 110 to determine whether the field referenced by the input field_ID 1802 has been mapped to an attribute 320 of any of the class-based objects 305 contained in the class-based object database 115.

If the field referenced by the field_ID 1802 has not been mapped to an attribute 320, then, in STEP 2 1820, the locate_object procedure 1801 performs a lookup in the classless object database 114 on every classless object 205. The locate_object procedure 1801 retrieves the classless object ID 210 for each classless object 205 having a field value 224 equal to the input field value 1803. A list of the classless object IDs 1804 is returned to the calling classless object model application 103.

If the field referenced by the field_ID 1802 has been mapped to an attribute 320, the locate_object procedure 1801 performs a lookup on the field method table 111 in STEP 3 1830 to retrieve the class 315 to which the attribute 320 belongs, along with the method 330 for reading the attribute to which the field 220 is mapped.

In STEP 4 1840, the locate_object procedure 1801 performs a lookup on the identification table 112 to retrieve the class-based object ID 310 of every class-based object 305 in the class-based object database 115 belonging to the class 315 having the attribute 320 to which the field 220 is mapped.

For each of the class-based object IDs 310 retrieved in STEP 4 1840, the locate_object procedure 1801 in STEP 5 1850 retrieves the value of the attribute 320 to which the field 220 is mapped to determine if the value of the attribute is equal to the input field value 1803.

In STEP 6 1860, the locate_object procedure 1801 performs a lookup on the identification table 112 to retrieve the classless object ID 210 for each class-based object 305 having an attribute value equal to the input field value 1803.

Finally, in the case where the field is mapped, all the classless object IDs 210 located in STEPS 3 through 6 are returned to the calling classless object model application 103.

The above description details the coexistence of data and applications based on both the classless object model platform 101 and the class-based object model platform 105. The necessity of the present invention becomes critical after at least one classless data model application 103 has migrated to the class-based data model platform 105. To accomplish the migration, the application must be updated by the application developer to run on the class-based object platform 105, a field-to-attribute mapping file must be created, and the data owned by the migrating application must be converted from the classless object model 200 to the class-based model 300. In accordance with the present invention, the object conversion process must also update the field location table 110, the field method table 111, and the identification table 112 in order to allow the object conversion system 100 to run properly.

One means of accomplishing the migration object conversion process is through batch processing means. The preferred embodiment of the batch processing means is implemented with a computer program, migrate_data 1901, depicted in FIG. 19. The migrate_data program 1901 accepts as input a field-to-attribute mapping file 1902 provided by the application developer, and the classless objects 1903 from the classless object database 114. The migrate_data program 1901 processes each classless object 1903 one at a time.

Figure 19:
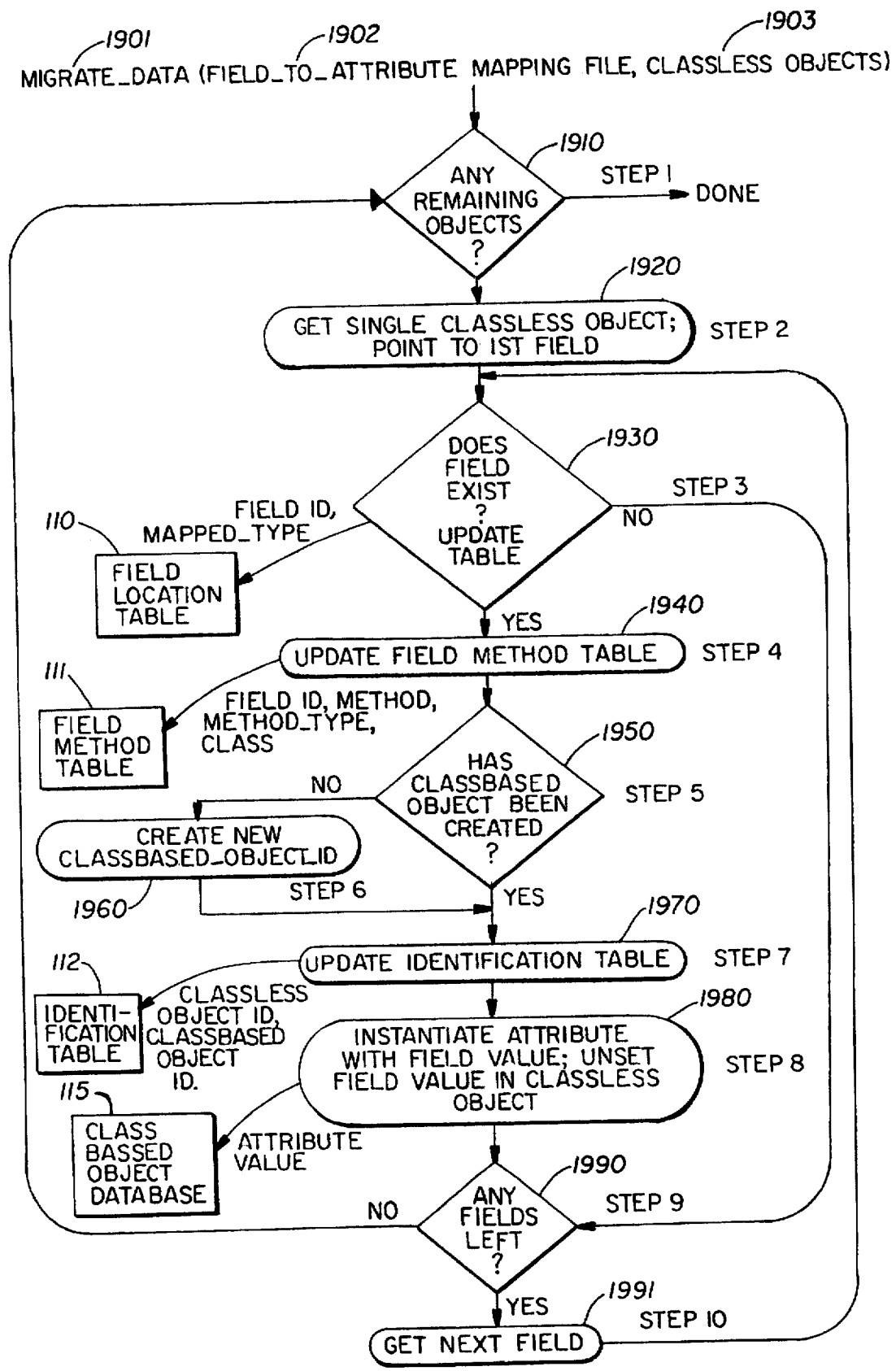
FIG. 19 is a flow diagram of the preferred embodiment of the migration means.

In STEP 1 1910 of FIG. 19, the migrate_data program 1901 checks for any existing unprocessed classless objects 1903. If all the classless objects 1903 have been processed already, or no classless objects exist, the migrate_data program 1901 is finished.

If any unprocessed classless objects still exist, the migrate_data program 1901 retrieves a single classless object from the input classless objects 1903 in STEP 2, and points to its first field to be processed.

In STEP 3 1930, the migrate_data program 1901 reads the input field_to_attribute mapping file 1902 to determine if the processed field has a mapping to an attribute 320 of a class 315. If a field-to-attribute mapping exists in the field-to-attribute mapping file 1902 for the processed field, the migrate_data program 1901 creates an entry into the field location table 110 comprising the field_ID 221 of the field and a mapped_type 802 having a value of TRUE. If no field-to-attribute mapping exists in the field-to-attribute mapping file 1902 for the processed field, the migrate_data program 1901 creates an entry into the field location table 110 comprising the field_ID 221 of the field and a mapped_type 802 having a value of FALSE and moves to STEP 9.

If a field-to-attribute mapping does exist in the field-to-attribute mapping file 1902, the migrate_data program 1901 moves to STEP 4 1940 to update the field method table 111 with an entry comprising the field_ID 221 corresponding to the processed field, the method 330 for accessing the attribute 320 to which the processed field is mapped, the class to which the attribute 330 belongs, and a method_type 904 of GET. The tables must be updated in order to allow non-migrated applications to use the object conversion system 100 to access the migrated data.

In STEP 5 1950, the migrate_data program 1901 determines whether a class-based object has already been created which corresponds to the processed object and which belongs to the class having the attribute to which the processed field is to be mapped. If no such class-based object has yet been created, a new class-based object ID 310 is generated in STEP 6 1960.

The identification table 112 is updated in STEP 7 1970. The migrate_data program 1901 creates an entry into the identification table 112 comprising the classless object identifier of the single processed object to which the processed field belongs, the class-based object identifier 310 of the class-based object 305 which has been instantiated with the value of the processed field, and the class 315 to which the instantiated class-based object 305 belongs.

In STEP 8 1980, the newly created class-based object 305 or the already created class-based object 305 is instantiated by setting the value of the attribute 320 to which the processed field is mapped to the value of the processed field. Also in STEP 1980, the value of the processed field is unset in the classless object database 114.

STEP 9 1990 is reached after instantiating a class-based object 305 by setting the value of one of its attributes to the value of the processed field in STEP 8 1980, or after determining in STEP 3 1930 that no field-to-attribute mapping exists for the processed field. In STEP 9 1990, the migrate_data program 1901 determines whether any remaining unprocessed fields exist for the processed classless object 1903. If unprocessed fields do exist for this processed classless object 1903, the next remaining unprocessed field is retrieved in STEP 10 1991. STEPS 3 through 10 are repeated until there are no remaining unprocessed fields.

When no remaining unprocessed fields exist in STEP 9 1990, the migrate_data program 1901 repeats STEPS 1 through 10 until no remaining unprocessed objects 1903 exist, at which time, the migrate_data program 1901 completes and all classless objects 1903 have been migrated.

Based upon the foregoing detailed description, the present invention provides a method and system for migrating objects from a classless object model to a class-based object model, while allowing coexistence of concurrently running applications requiring either the classless object space or the class-based object space.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An object conversion system for allowing coexistence of data and applications based on a classless object model with data and applications based on a class-based object model, wherein a classless object based on said classless object model comprises at least a classless object identifier and a plurality of fields having field values, and wherein a class-based object based on said class-based object model comprises a class-based object identifier, a plurality of attributes, and a plurality of methods for accessing said attributes, according to a defined class, said object conversion system comprising:

a field location table for storing a mapping designation for indicating whether a field of a classless object has been mapped to an attribute of a class-based object;

a field method table for storing mappings of fields to both their corresponding class and attribute;

an identification table for storing mappings between a classless object identifier and its corresponding class and class-based object identifier;

an object description table for storing mappings between a classless object identifier to each of said plurality of fields associated with said classless object identifier; and a plurality of procedures comprising field creation means for creating a field; field retrieval means for retrieving the value of a field; field setting means for setting the value of a field; object field retrieval means for retrieving the values of every field associated with a given classless object identifier; proxy object creation means for creating a classless object identifier for a newly-created class-based object; proxy object deletion means for removing the classless object identifier of a deleted class-based object; and object location means for locating the classless object identifiers for all classless objects having a given value for a given field.

2. The system of claim 1, wherein said field location table comprises a plurality of entries, each entry comprising:
a field identifier, and
a designation indicating whether or not the field associated with said field identifier has been mapped to an attribute of a class.

3. The system of claim 1, wherein said field method table comprises a plurality entries, each entry comprising:
a field identifier, and
an attribute to which a field referenced by said field identifier is mapped.

4. The system of claim 1, wherein said field method table comprises a plurality of entries, each entry comprising:
a field identifier,
a method for accessing the attribute to which a field referenced by said field identifier is mapped,
a method type designating what type of operation said method performs, and
a class to which said attribute belongs.

5. The system of claim 1, wherein said identification table comprises a plurality of entries, each entry comprising:
a class-based object identifier for referencing a class-based object,
a class to which said class-based object belongs, and
a classless object identifier for referencing a classless object having a field which maps to an attribute of said class-based object.

6. The system of claim 1, wherein said object description table comprises a plurality of entries, each entry comprising:
a classless object identifier for referencing a classless object, and
a list of every field associated with said classless object.

7. The system of claim 6, wherein said list of every field associated with said classless object comprises a linked list.

8. The system of claim 1, wherein said field creation means includes processing means for performing the steps of:
accepting as input an input field identifier for referencing a field and an input attribute to which said referenced field is mapped;
creating a new entry in the field location table, said entry comprising said input field identifier and a designation indicating said referenced field is created by an application based on said class-based object model; and,
creating a new entry in the field method table, said entry comprising said input field identifier, and said input attribute to which said referenced field is mapped.

9. The system of claim 1, wherein said field creation means includes processing means for performing the steps of:
accepting as input an input field identifier for referencing a field and an input method for accessing an attribute to which said referenced field is mapped, an input method type designating the operation performed by said method, and an input class to which said attribute belongs;
creating a new entry in the field location table, said entry comprising said input field identifier and a designation indicating said referenced field is created by an application based on said class-based object model; and,
creating a new entry in the field method table, said entry comprising said input field identifier, and said input method, said input method type, and said input class.

10. The system of claim 1, wherein said field retrieval means includes processing means for performing the steps of:
accepting as input an input classless object identifier and an input field_identifier for referencing a field from which to retrieve its value;
performing a lookup on the field location table to determine whether said referenced field has been mapped; and
where said referenced field has not been mapped,
performing a lookup on a classless object referenced by said input classless object identifier to retrieve the value of said referenced field; and where said referenced field has been mapped,
performing a lookup, based on said input classless object identifier, on the identification table to retrieve a corresponding class-based object identifier for said input classless object identifier,
performing a lookup, based on said input field identifier, on the field method table to determine a corresponding class and corresponding attribute to which said referenced field is mapped, and
performing a lookup on a class-based object referenced by said corresponding class-based object identifier, said referenced class-based object belonging to said corresponding class and having said corresponding attribute, to retrieve the value of said corresponding attribute to which said referenced field is mapped.

11. The system of claim 1, wherein said field retrieval means includes processing means for performing the steps of:
accepting as input an input classless object identifier and an input field identifier for referencing a field from which to retrieve its value;
performing a lookup on the field location table to determine whether said referenced field has been mapped; and
where said referenced field has not been mapped,
performing a lookup on a classless object referenced by said input classless object identifier to retrieve the value of said referenced field; and
where said referenced field has been mapped,
performing a lookup, based on said input classless object identifier, on the identification table to retrieve a corresponding class-based object identifier for said input classless object identifier, performing a lookup, based on said input field identifier, on the field method table to determine a corresponding class and corresponding method for retrieving a corresponding attribute to which said referenced field is mapped, and performing a method call on a class-based object referenced by said class-based object identifier, said referenced class-based object belonging to said corresponding class and having said corresponding attribute, to retrieve the value of said corresponding attribute to which said referenced field is mapped.

12. The system of claim 1, wherein said field setting means includes processing means for performing the steps of:

accepting as input an input field value, an input classless object identifier and an input field identifier for referencing a field to which said input field value is to be set;

performing a lookup on the field location table to determine whether said referenced field has been mapped; and where said referenced field has not been mapped,
performing a lookup on a classless object referenced by said input classless object identifier to set the value of said referenced field to the input field value; and where said referenced field has been mapped,
performing a lookup, based on said input classless object identifier, on the identification table to retrieve a corresponding class-based object identifier for said input classless object identifier, performing a lookup, based on said input field identifier, on the field method table to determine a corresponding class and corresponding attribute to which said referenced field is mapped, and performing a lookup on a class-based object referenced by said corresponding class-based object identifier, said referenced class-based object belonging to said corresponding class and having said corresponding attribute, to set the value of said corresponding attribute to which said referenced field (220 is mapped to the input field value.

13. The system of claim 1, wherein said field setting means includes processing means for performing the steps of:

accepting as input an input field value, an input classless object identifier and an input field identifier for referencing a field to which said input field value is to be set;

performing a lookup on the field location table to determine whether said referenced field has been mapped; and where said referenced field has not been mapped,
performing a lookup on a classless object referenced by said input classless object identifier and said input field identifier to set the value of said referenced field; and where said referenced field has been mapped,
performing a lookup, based on said input classless object identifier, on the identification table to retrieve a corresponding class-based object identifier for said input classless object identifier, performing a lookup, based on said input field identifier, on the field method table to determine a corresponding class and corresponding method for retrieving the value of a corresponding attribute to which said referenced field is mapped, and performing a method call on a class-based object referenced by said class-based object identifier, said referenced class-based object belonging to said corresponding class and having said corresponding attribute, to set the value of said corresponding attribute to which said referenced field is mapped to the input field value.

14. The system of claim 1, wherein said object field retrieval means includes processing means for performing the steps of:

accepting as input a classless object identifier for referencing a classless object;

performing a lookup on the object description table to obtain a list of every field associated with said referenced classless object, each field being referenced by its corresponding field identifier; and for each field in said list, performing the steps of:
performing a lookup on the field location table to determine whether or not said referenced field has been mapped; and where said referenced field has not been mapped,
retrieving the value of said referenced field from said referenced classless object; and where said referenced field has been mapped,
performing a lookup on the field method table to obtain a corresponding class and corresponding attribute to which said referenced field is mapped, performing a lookup on the identification table to obtain a corresponding class-based object identifier for referencing a corresponding class-based object to which said referenced classless object corresponds, and performing a lookup on said corresponding class-based object, said referenced class-based object belonging to said corresponding class and having said corresponding attribute, to retrieve the value of said corresponding attribute to which said referenced field is mapped.

15. The system of claim 1, wherein said object field retrieval means includes processing means for performing the steps of:

accepting as input a classless object identifier for referencing a classless object;

performing a lookup on the object description table to obtain a list of every field associated with said referenced classless object, each field being referenced by its corresponding field identifier; and for each field in said list, performing the steps of:
performing a lookup on the field location table to determine whether or not said referenced field has been mapped; and where said referenced field has not been mapped,
retrieving the value of said referenced field from said referenced classless object; and where said referenced field has been mapped,
performing a lookup on the field method table to obtain a corresponding class and corresponding method for accessing the corresponding attribute to which said referenced field is mapped, performing a lookup on the identification table to obtain a corresponding class-based object identifier for referencing a corresponding class-based object to which said referenced classless object corresponds, and performing a method call on said corresponding class-based object, said referenced class-based object belonging to said corresponding class and having said corresponding attribute, to retrieve the value of said corresponding attribute to which said referenced field is mapped.

16. The system of claim 1, wherein said object field retrieval means includes processing means for performing the steps of:
   accepting as input a classless object identifier for referencing a classless object;
   performing a lookup on the object description table to obtain a list of every field associated with said referenced classless object, each field being referenced by its corresponding field identifier; and
   for each field in said list, utilizing the field retrieval means 122 to retrieve the value of each field associated with said referenced classless object and contained in said list.

17. The system of claim 1, wherein said proxy object creation means includes processing means for performing the steps of:
   accepting as input an input class-based object identifier for referencing a class-based object, an input class to which said referenced class-based object belongs, and a list of every field associated with said referenced class-based object;
   creating a new classless object identifier for use by applications based on said classless object model; and
   adding an entry into the identification table, said entry comprising said newly created classless object identifier, said input class-based object identifier, and said input class; and
   adding an entry into the object description table, said entry comprising said newly created classless object identifier and said input list of fields.

18. The system of claim 1, wherein said proxy object deletion means includes processing means for performing the steps of:
   accepting as input a class-based object identifier; and
   removing all entries in the identification table referenced by said input class-based object identifier; and
   removing all entries in the object description table referenced by said input class-based object identifier.

19. The system of claim 1, wherein said object location means includes processing means for performing the steps of:
   accepting as input an input field identifier for referencing a field and an input field value;
   performing a lookup on the field location table to determine whether said referenced field has been mapped; and
   where said referenced field has not been mapped,
      sorting through a classless object database comprising a plurality of classless objects to locate each classless object owning said referenced field;
      comparing the value of said referenced field of said field owning classless object to said input field value;
      retrieving and returning the classless object identifier referencing said field owning classless object where said value of said referenced field equals the input field value; and
   where said referenced field has been mapped,
      performing a lookup, based on said input field identifier, on the field method table to determine a corresponding class and corresponding attribute to which said referenced field is mapped,
      performing a lookup, based on said corresponding class, on the identification table to retrieve a class member list comprising a plurality of class-based object identifiers and referencing each class-based object belonging to said corresponding class, and
      for each of said plurality of class-based object identifiers contained in said class member list, performing a lookup on its corresponding class-based object to retrieve the value of said corresponding attribute to which said referenced field is mapped, comparing the value of said corresponding attribute to said input field value, and creating a class-based object identifier list of all class-based object identifiers having a corresponding attribute value equal to the input field value, wherein said referenced field is mapped to said attribute; and
      performing a lookup on the identification table to retrieve and return a classless object identifier for each class-based identifier contained in said class-based identifier list.

20. The system of claim 1, wherein said object location means includes processing means for performing the steps of:
   accepting as input an input field identifier for referencing a field and an input field value;
   performing a lookup on the field location table to determine whether said referenced field has been mapped; and
   where said referenced field has not been mapped,
      sorting through a classless object database comprising a plurality of classless objects to locate each classless object owning said referenced field;
      comparing the value of said referenced field of said field owning classless object to said input field value;
      retrieving and returning the classless object identifier referencing said field owning classless object where said value of said referenced field equals the input field value; and
   where said referenced field has been mapped,
      performing a lookup, based on said input field identifier, on the field method table to determine a corresponding class and corresponding method for accessing a corresponding attribute to which said referenced field is mapped,
      performing a lookup, based on said corresponding class, on the identification table to retrieve a class member list comprising a plurality of class-based object identifiers and referencing each class-based object belonging to said corresponding class, and
      for each of said plurality of class-based object identifiers contained in said class member list, performing a method call on its corresponding class-based object to retrieve the value of said corresponding attribute to which said referenced field is mapped, comparing the value of said corresponding attribute to said input field value, and creating a class-based object identifier list of all class-based object identifiers having a corresponding attribute value equal to the input field value, wherein said referenced field is mapped to said attribute; and
      performing a lookup on the identification table to retrieve and return a classless object identifier for each class-based identifier contained in said class-based identifier list.

21. The system of claim 1, further comprising migrating means for migrating classless objects based on said classless object model to class-based objects based on said class-based object model.

22. The system of claim 21, said migrating means accepting as input an input mapping file comprising a plurality of entries, each entry comprising a field identifier for referencing a field and a corresponding class and attribute to which said field is mapped, and said migrating means also accepting as input a plurality of classless objects owned by a migrating application, wherein each of said plurality of owned classless objects comprises a classless object identifier and a plurality of fields having field values and referenced by field identifiers, said migrating means processing a single classless object one at a time from said plurality of input classless objects by reference to its classless object identifier, and for each field owned by said single classless object and having its corresponding field identifier contained in said input mapping file, performing the steps of:

adding an entry to the field location table, said field location table entry comprising the field identifier referencing said owned field and a designation indicating that said field has been mapped;

adding an entry to the field method table, said field method table entry comprising the field identifier for referencing said owned field, and the class and attribute contained in the input mapping file to which said owned field is mapped;

creating a new class-based object identifier;

adding an entry to the identification table, said identification table entry comprising the classless object identifier referencing the single classless object, the class contained in the input mapping file to which the owned field is mapped, and the newly created class-based object identifier;

instantiating a new class-based object, corresponding to the newly created class-based object identifier, by setting the attribute to which the owned field is mapped to the value of the owned field; and unsetting the value of the owned field of the single classless object.

23. The system of claim 21, said migrating means accepting as input an input mapping file comprising a plurality of entries, each entry comprising a field identifier for referencing a field and a corresponding class, attribute, and method for accessing said attribute to which said field is mapped, and said migrating means also accepting as input a plurality of classless objects owned by a migrating application, wherein each of said plurality of owned classless objects comprises a classless object identifier and a plurality of fields having field values and referenced by field identifiers, said migrating means processing a single classless object one at a time from said plurality of input classless objects by reference to its classless object identifier, and for each field owned by said single classless object and having its corresponding field identifier contained in said input mapping file, performing the steps of:

adding an entry to the field location table, said field location table entry comprising the field identifier referencing said owned field and a designation indicating that said field has been mapped;

adding an entry to the field method table, said field method table entry comprising the field identifier for referencing said owned field, and the class and method for accessing the attribute to which said owned field is mapped;

creating a new class-based object identifier;

adding an entry to the identification table, said identification table entry comprising the classless object identifier referencing the single classless object, the class contained in the input mapping file to which the owned field is mapped, and the newly created class-based object identifier;

instantiating a new class-based object, corresponding to the newly created class-based object identifier, by setting the attribute to which the owned field is mapped to the value of the owned field; and unsetting the value of the owned field of the single classless object.

24. An object migration system for migrating data and applications from a classless object model platform to a class-based object model platform, wherein a classless object based on said classless object model comprises at least a classless object identifier and a plurality of fields having field values, and wherein a class-based object based on said class-based object model comprises a class-based object identifier, a plurality of attributes and a plurality of methods according to a defined class, said object migration system comprising:

a field location table for storing a mapping designation for indicating whether a field of a classless object has been mapped to an attribute of a class-based object;

a field method table for storing mappings between fields and their corresponding classes and methods for accessing their corresponding attributes;

an identification table for storing mappings between a classless object identifier and its corresponding class and class-based object identifier;

an object description table for storing mappings between a classless object identifier to each of said plurality of fields associated with said classless object identifier; and migration means for migrating classless objects based on said classless object model to class-based objects based on said class-based object model, and for updating said field location table, field method table, and identification table for allowing access to said migrated classless objects by non-migrated applications based on the classless object model.

25. The system of claim 24, said migrating means accepting as input an input mapping file comprising a plurality of entries, each entry comprising a field identifier for referencing a field and a corresponding class, attribute, and method for accessing said attribute to which said field is mapped, and said migrating means also accepting as input a plurality of classless objects owned by a migrating application, wherein each of said plurality of classless objects comprises a classless object identifier and a plurality of fields having field values and referenced by field identifiers, said migrating means processing a single classless object one at a time from said plurality of input classless objects by reference to its classless object identifier, and for each field owned by said single classless object and having its corresponding field identifier contained in said input mapping file, performing the steps of:

adding an entry to the field location table, said field location table entry comprising the field identifier referencing said owned field and a designation indicating that said field has been mapped;

adding an entry to the field method table, said field method table entry comprising the field identifier for referencing said owned field, and the class and method for accessing the attribute to which said owned field is mapped;

creating a new class-based object identifier;

adding an entry to the identification table, said identification table entry comprising the classless object identifier referencing the single classless object, the class contained in the input mapping file to which the owned field is mapped, and the newly created class-based object identifier;

instantiating a new class-based object, corresponding to the newly created class-based object identifier, by setting the attribute to which the owned field is mapped to the value of the owned field; and unsetting the value of the owned field of the single classless object.

* * * * *